(12) United States Patent  
Gu et al.

(10) Patent No.: US 8,161,434 B2  
(45) Date of Patent: Apr. 17, 2012

(54) STATISTICAL FORMAL ACTIVITY ANALYSIS WITH CONSIDERATION OF TEMPORAL AND SPATIAL CORRELATIONS

(75) Inventors: Zhenyu Gu, Santa Clara, CA (US); Kenneth S. McElvain, Menlo Park, CA (US)

(73) Assignee: Synopsys, Inc., Mountain View, CA (US)

( * ) Notice: Subject to any disclaimer, the term of this patent is extended or adjusted under 35 U.S.C. 154(b) by 460 days.

(21) Appl. No.: 12/399,795

(22) Filed: Mar. 6, 2009

(65) Prior Publication Data

US 2010/0229132 A1   Sep. 9, 2010

(51) Int. Cl.
*G06F 17/50* (2006.01)
*G06F 9/45* (2006.01)

(52) U.S. Cl. ........ 716/103; 716/105; 716/106; 716/109; 716/136; 703/2; 703/13; 703/14

(58) Field of Classification Search .................. 716/103, 716/105, 106, 109, 136; 703/2, 13, 14
See application file for complete search history.

(56) References Cited

U.S. PATENT DOCUMENTS

| | | | | |
|---|---|---|---|---|
| 5,752,000 A * | 5/1998 | McGeer et al. ................. | 703/14 |
| 5,774,370 A * | 6/1998 | Giomi .......................... | 716/105 |
| 5,966,523 A * | 10/1999 | Uchino ........................ | 703/2 |
| 6,363,520 B1 * | 3/2002 | Boubezari et al. ............ | 716/103 |
| 6,408,428 B1 * | 6/2002 | Schlansker et al. ........... | 716/104 |
| 6,578,176 B1 * | 6/2003 | Wang et al. .................. | 716/133 |
| 6,687,882 B1 * | 2/2004 | McElvain et al. ............. | 716/103 |
| 6,701,501 B2 * | 3/2004 | Waters et al. ................. | 716/103 |
| 6,816,825 B1 * | 11/2004 | Ashar et al. .................. | 703/14 |
| 6,952,816 B2 * | 10/2005 | Gupta et al. .................. | 716/103 |
| 7,000,213 B2 * | 2/2006 | Banerjee et al. .............. | 716/103 |
| 7,076,712 B2 | 7/2006 | Prasad et al. | |
| 7,222,039 B2 | 5/2007 | Wilcox et al. | |
| 7,224,185 B2 * | 5/2007 | Campbell et al. ............. | 326/46 |
| 7,278,120 B2 | 10/2007 | Rahmat et al. | |
| 7,284,218 B1 | 10/2007 | Roy et al. | |
| 7,308,672 B2 * | 12/2007 | Waters et al. ................. | 716/103 |
| 7,366,997 B1 | 4/2008 | Rahmat et al. | |
| 7,383,166 B2 * | 6/2008 | Ashar et al. .................. | 703/14 |
| 7,565,631 B1 * | 7/2009 | Banerjee et al. .............. | 716/103 |
| 7,904,850 B2 * | 3/2011 | Spackman et al. ............ | 703/13 |

(Continued)

OTHER PUBLICATIONS

Tan et al.; "Estimation of sequential circuit activity considering spatial and temporal correlations"; Publication Year: 1995; Computer Design: VLSI in Computers and Processors, 1995. ICCD '95. Proceedings., 1995 IEEE International Conference on; pp. 577-582.*

(Continued)

*Primary Examiner* — Helen Rossoshek
(74) *Attorney, Agent, or Firm* — Blakely, Sokoloff, Taylor & Zafman LLP; Judith A. Szepesi

(57) ABSTRACT

Techniques for statistical formal activity analysis with consideration of temporal and/or spatial correlations are described herein. According to one embodiment, a sequential circuit having a feedback loop is unrolled into multiple unrolled circuits, where the sequential circuit is represented by a finite state machine (FSM). A temporal correlation is introduced to each of the unrolled circuits via a correlation network for an activity analysis of the sequential circuit. The temporal correlation represents a dependency relationship between a current logic state of a signal and a previous logic state of the signal. Other methods and apparatuses are also described.

22 Claims, 26 Drawing Sheets

U.S. PATENT DOCUMENTS

| | | | | |
|---|---|---|---|---|
| 2002/0144092 | A1* | 10/2002 | Topham et al. | 712/217 |
| 2010/0058261 | A1* | 3/2010 | Markov et al. | 716/5 |
| 2010/0191791 | A1* | 7/2010 | Patel et al. | 708/401 |

OTHER PUBLICATIONS

Arora et al.; "Enhancing SAT-based Bounded Model Checking using sequential logic implications"; Publication Year: 2004; VLSI Design, 2004. Proceedings. 17th International Conference on; pp. 784-787.*

PCT International Search Report and Written Opinion for International Application No. PCT/US2010/026448, mailed Oct. 25, 2010, 11 pages.

PCT International Preliminary Report on Patentability for International Application No. PCT/US2010/026448, issued Sep. 6, 2011, 7 pages.

Ghosh, Abhijit et al., "Estimation of Average Switching Activity in Combinational and Sequential Circuits," Design Automation Conference, 1992, Proceedings, $29^{th}$ ACM/IEEE, Jun. 8-12, 1992, pp. 253-259.

Kapoor, Bhanu, "Improving the Accuracy of Circuit Activity Measurement," Design Automation, 1994, $31^{st}$ Conference on, Jun. 6-10, 1994, pp. 734-739.

Kozhaya, Joseph N. et al., "Accurate Power Estimation for Large Sequential Ciciuts," Computer-Aided Design, 1997, Digest of Technical Papers, 1997 IEEE/ACM International Conference on, Nov. 9-13, 1997, pp. 488-493.

Lamoureux, Julien et al., "Activity Estimation for Field-Programmable Gate Arrays," Field Programmable Logic and Applications, 2006, FPL '06, International Conference on, Aug. 28-30, 2006, pp. 1-8.

Marculescu, Radu et al., "Switching Activity Analysis Considering Spatiotemporal Correlations," Computer-Aided Design, 1994, IEEE/ACM International Conference on, Nov. 6-10, 1994, pp. 294-299.

Monteiro, Jose et al., "A Methodology for Efficient Estimation of Switching Activity in Sequential Logic Circuits," Design Automation, 1994, $31^{st}$ Conference on, Jun. 6-10, 1994, pp. 12-17.

Najm, Farid, "A Survey of Power Estimation Techniques in VLSI Circuits," IEEE Transactions on Very Large Scale Integration (VLSI) Systems, vol. 2, No. 4, Dec. 1994, pp. 446-455.

Pedram, Massoud, "Power Simulation and Estimation in VLSI Circuits," *The VLSI Handbook*, Edited by W-K Chen, The CRC Press and the IEEE Press, 1999.

Pedram, Massoud, "Tutorial and Survey Paper; Power Minimization in IC Design: Principles and Applications," ACM Transactions on Design Automation of Electronic Systems, vol. 1, No. 1, Jan. 1996, pp. 3-56.

Schneider, Peter H. et al., "Effects of Correlations on Accuracy of Power Analysis—An Experimental Study," Low Power Electronics and Design, 1996, International Symposium on, Aug. 12-14, 1996, pp. 113-116.

Tsui, Chi-Ying et al., "Exact and Approximate Methods for Calculating Signal and Transition Probabilities in FSMs," Design Automation Conference Proceedings 1996, $33^{rd}$, Jun. 3-7, 1996, pp. 165-168.

Uchino, Taku et al., "Switching Activity Analysis for Sequential Circuits using Boolean Approximation Method," Low Power Electronics and Design, 1996, International Symposium on, Aug. 12-14, 1996, pp. 79-84.

Uchino, Taku et al., "Switching Activity Analysis using Boolean Approximation Method," Computer-Aided Design, 1995, ICCAD-95, Digest of Technical Papers, 1995 IEEE/ACM International Conference on, Nov. 5-9, 1995, pp. 20-25.

Wu, Qing et al., "A Note on the Relationship Between Signal Probability and Switching Activity," Design Automation Conference 1997, Proceedings of the ASP-DAC '97, Asia and South Pacific, Jan. 28-31, 1997, pp. 117-120.

\* cited by examiner

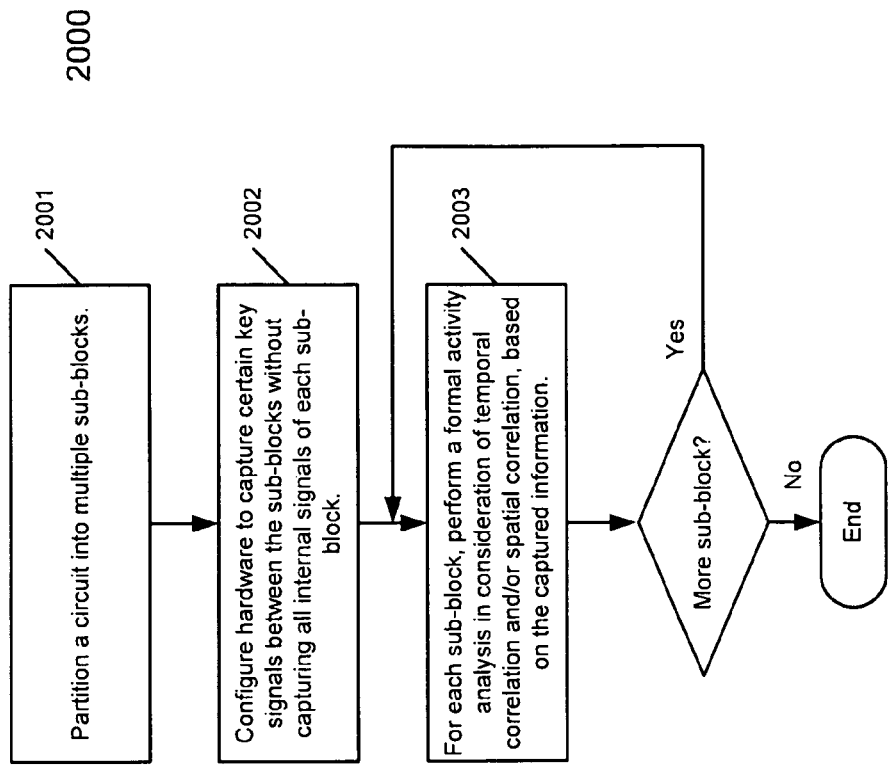

STATISTICAL FORMAL ACTIVITY ANALYSIS WITH CONSIDERATION OF TEMPORAL AND SPATIAL CORRELATIONS

FIELD OF THE INVENTION

The present invention relates generally to automated circuit activity analysis. More particularly, this invention relates to statistical formal activity analysis in consideration of temporal and/or spatial correlations. The results of the analysis can be used to analyze and optimize the design of a circuit.

BACKGROUND

For the design of digital circuits (e.g., on the scale of very large scale integration (VLSI) technology), designers often employ computer-aided techniques. Standard languages such as hardware description languages (HDLs) have been developed to describe digital circuits to aid in the design and simulation of complex digital circuits. Several hardware description languages, such as VHDL and Verilog, have evolved as industry standards. VHDL and Verilog are general-purpose hardware description languages that allow definition of a hardware model at the gate level, the register transfer level (RTL) or the behavioral level using abstract data types. As device technology continues to advance, various product design tools have been developed to adapt HDLs for use with newer devices and design styles.

In designing an integrated circuit with an HDL code, the code is first written and then compiled by an HDL compiler. The HDL source code describes at some level the circuit elements, and the compiler produces an RTL netlist from this compilation. The RTL netlist is typically a technology independent netlist in that it is independent of the technology/architecture of a specific vendor's integrated circuit, such as field programmable gate arrays (FPGA) or an application-specific integrated circuit (ASIC). The RTL netlist corresponds to a schematic representation of circuit elements (as opposed to a behavioral representation). A mapping operation is then performed to convert from the technology independent RTL netlist to a technology specific netlist, which can be used to create circuits in the vendor's technology/architecture. It is well known that FPGA vendors utilize different technology/architecture to implement logic circuits within their integrated circuits. Thus, the technology independent RTL netlist is mapped to create a netlist, which is specific to a particular vendor's technology/architecture. During the mapping process small collections of logic operations and the signals between them are mapped into gates or LUTs in the case of FPGAs. Power can be minimized at this stage by maximizing the activity of the signals that are covered or mapped inside of the gates or LUTs, leaving lower activity signals to be routed on wires between the logic cells.

During placement of components on the chip, the algorithms used typically try to optimize the total wiring and the delay along critical paths by placing connected components and critical path cells close together. A reduction in power consumption can also be an objective during placement. In this case the objective is to make the wires for signals that are switching rapidly shorter.

Power becomes the bottleneck of next generation nano-scale IC (integrated circuit) designs due to the aggressive technology scaling. Circuit activity analysis is a key missing input for many kinds of power estimations and optimizations. In the current EDA (electronic design automation) industry, there is no low-cost solution for the activity analysis due to the extremely long running-time with a simulation-based method for large industrial-level designs and the difficulty of constructing test benches that will mimic the activity created by real world use of the circuit. Therefore, most designs today either do not explicitly consider circuit activity during the power analysis and optimization or assume a global toggle rate percentage relative to the frequency of the clock signals for all signals of the circuit, which is far away from reality.

Switching activity analysis is a key missing element for both power estimation and power optimization of the integrated circuits (ICs) as the power consumption becomes one of the bottleneck in the IC design.

The problem definition of a circuit switching activity analysis is as follows: given the state and transition probabilities of all inputs of a circuit, provide state and transition probabilities of all the internal signals and outputs of the circuit. Here, two quantified parameters are used to specify the activities of a signal A: 1) a state probability $P(A)$ (e.g., a probability of signal A at logic 1); and 2) a transition probability $T(A)$ (e.g., a probability of signal A switching from logic 1 to logic 0 or from logic 0 to logic 1).

A straightforward approach of performing a switching activity analysis is simulation traces such as the Monte Carlo Simulation (MCS), which consists of applying randomly generated input patterns at the circuit inputs and counting state and transition probabilities using a simulator. A disadvantage of the MCS is the requirement of a very long test bench to cover a large number of sequences of input patterns which requires a long running time. The number and length of the sequences requires increases rapidly with the number of flip-flops in the circuit since the number of states grows exponentially with the number of flip-flops. Therefore, most designers just simply apply a global switching activity rate on all signals, such as, for example, 25% of the clock frequency.

Another approach is called a vectorless circuit activity analysis or probabilistic-based circuit activity analysis based on signal probability computation. One basic tool used in sequential circuit analysis is the concept of unrolling the circuit which consists of iterating the circuit over clock cycles. Visually, you can think of multiple copies of a schematic stacked on top of each other with flip-flops replaced by wires connecting the input of the flip-flop on the lower sheet to the output connection of the flip flop on the sheet above. Signal values on the inputs and wires represent the circuit input and state in a first clock cycle and each successive sheet represents the inputs and states in the successive clock cycle. Some have proposed the idea of unrolling the next state logic in order to model a temporal correlation between two consecutive logic states of a finite state machine (FSM), i.e. the internal temporal correlation within the FSM. Further improvement was made by considering a spatial correlation of reconvergent paths. However, none of these methods considers the temporal and spatial correlations of input signals of an unrolled circuit. A simple spatial correlation example is two input signals to a sub-circuit that are never true at the same time, perhaps the output of a counter that counts 0, 1, 2, 0, . . . and never reaches 3. Recently, a close-form formula was proposed to characterize the state probability and switching activity of each single flop that has a feedback loop. However, this method only has the ability to model the temporal-spatial correlation of a state machine with one flop under the assumption of stateless enable signal and correlation-free inputs, which is rarely true.

SUMMARY OF THE DESCRIPTION

Techniques for statistical formal activity analysis with consideration of temporal and/or spatial correlations are described herein. The results of the activity analysis can be used to analyze and optimize the circuit design in the perspective of performance and/or power consumption. According to one aspect of the invention, a temporal correlation network is designed and utilized to introduce temporal correlation of input signals during an activity analysis. In a particular embodiment, a Boolean representation or equivalent logic circuit is used to represent a temporal correlation network.

In addition, according to another aspect of the invention, an efficient encoding scheme is utilized to represent the activity analysis information for a group of signals with their joint probabilities. The encoding scheme can be used to model a spatial correlation between a group of signals. A spatial correlation is related to a situation in which the logic state of a signal or a group of signals has dependency on the logic state of other signals.

Furthermore, according to another aspect of the invention, with the encoding scheme to represent the correct joint probabilities for a group of signals, the depth of an unrolled circuit (also referred to as an unrolling circuit) can be controlled within certain memory constraints and activity data can be converged with iterations of calculating the statistics of a shallowly unrolled circuit multiple times instead of computing the statistics of a more deeply unrolled circuit in one pass. In one embodiment, an efficient Boolean representation or equivalent logic circuit is utilized to represent a group of signals that has temporal, spatial, or both correlation dependencies between each other. As a result, embodiments of the invention can transform a very long chain of unrolled circuit (usually memory-consuming) into several iterations of a short unrolled circuit with the support of the joint probability information. Embodiments of the invention can dramatically reduce the peak memory usage while still maintain the same level of accuracy. Embodiments of the invention can also improve an accuracy of the activity analysis by iteratively unrolling the circuit which cannot be done with a traditional method due to the peak memory constraints.

Further, according to another aspect of the invention, for a large and complex circuit, instead of capturing activity information of all signals during the hardware accelerated emulating or prototyping, the circuit is partitioned into multiple blocks. Only a small set of key signals such as the activity data of flops and boundary information are captured by the hardware. By using the statistical formal analysis methods described throughout this application, the captured information can be propagated through the circuit and the activity data can be calculated for each signal. In comparison with a conventional method, this technique makes the on-board emulator/prototyping faster and much less area overhead. The analysis can be repeated in order to achieve a converged solution.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 20 is a flow diagram illustrating a process for performing an activity analysis according to another embodiment of the invention.

DETAILED DESCRIPTION

Figure 1:
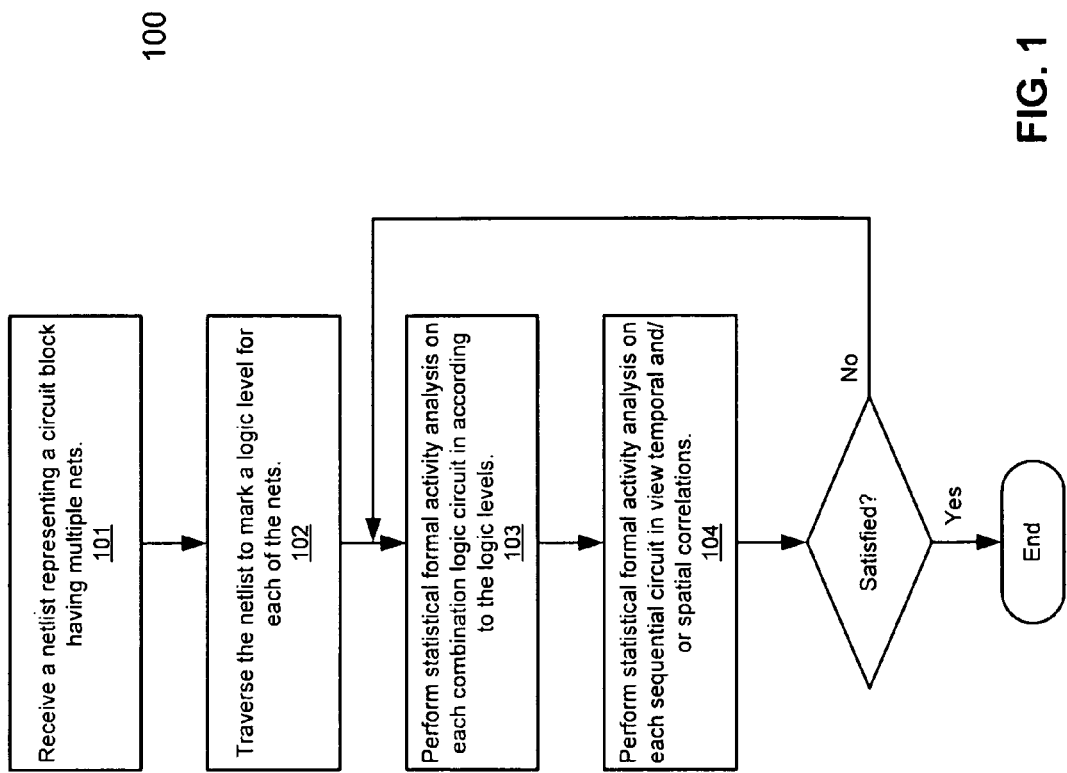
FIG. 1 is a flow diagram illustrating an example of a process for an activity analysis according to one embodiment of the invention.

Techniques for statistical formal activity analysis with consideration of temporal and/or spatial correlations are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

As described above, simply using unrolling a circuit cannot solve the temporal correlation problem since it does not include the temporal correlation of input signals. Temporal correlation is related to a situation in which a logic state of a signal or a group of signals has a dependency upon a previous logic state of the same signal or the same group of signals. According to one aspect of the invention, a temporal correlation network is designed and utilized to introduce temporal correlation of input signals during an activity analysis. In a particular embodiment, a Boolean representation or equivalent logic circuit is used to represent a temporal correlation network.

In addition, according to another aspect of the invention, an efficient encoding scheme is utilized represent the activity analysis information for a group of signals with their joint probabilities. The encoding scheme can be used to introduce spatial correlation between signals or a group of signals. A spatial correlation is related to a situation in which the logic state of a signal or a group of signals has dependency on the logic state of other signals.

Furthermore, according to another aspect of the invention, with the encoding scheme to represent the correct joint probabilities for a group of signals, the depth of an unrolled circuit can be controlled within certain memory constraints and activity data could be converged with iterations of calculating the unrolled circuits multiple times. In one embodiment, an efficient Boolean representation or equivalent logic circuit is utilized to represent a group of signals that has temporal, spatial, or both correlation dependencies between each other. As a result, embodiments of the invention can transform a deeply unrolled circuit (which is highly memory-consuming) into several computational iterations of a shallowly unrolled circuit with the support of the joint probability information. Embodiments of the invention can dramatically reduce the peak memory usage while still maintain the same level of accuracy. Embodiments of the invention can also improve an accuracy of the activity analysis by iteratively computing the statistics of the shallowly unrolled circuit which cannot be done with a traditional method due to the peak memory constraints.

Figure 19A:
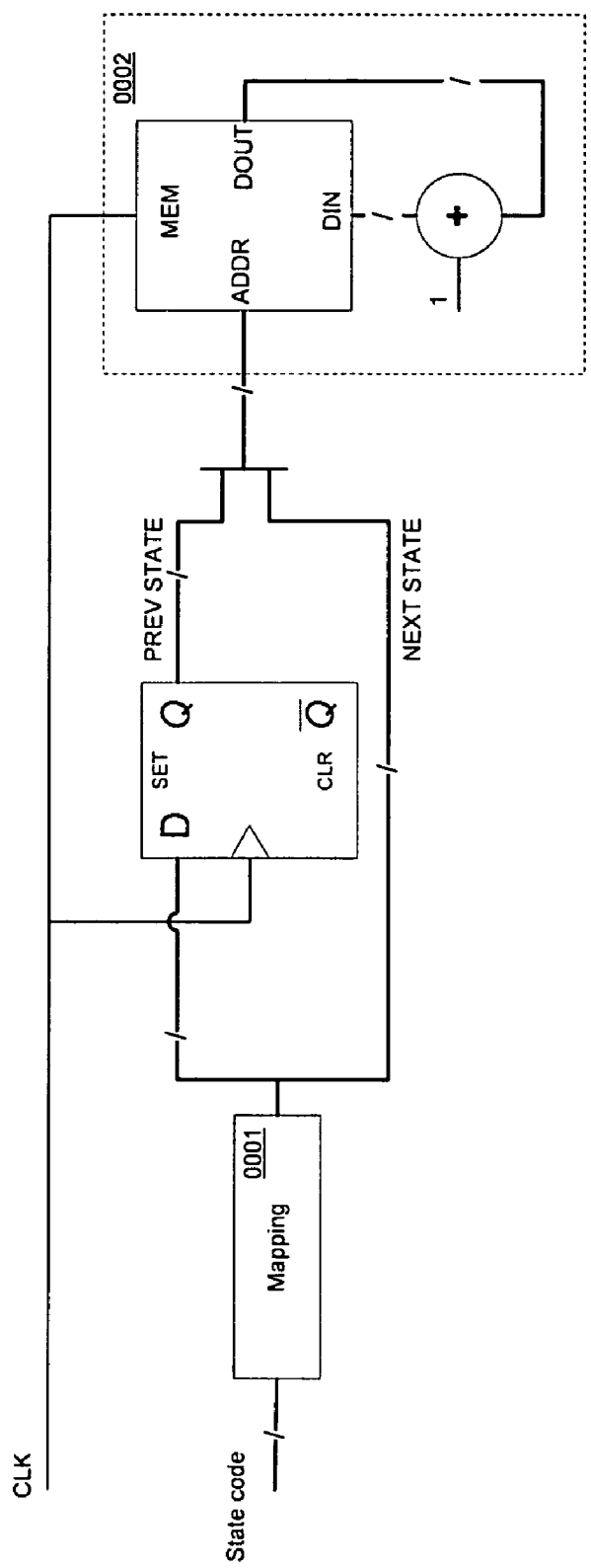
FIG. 19A is a schematic diagram illustrating an example of circuit which may be used with an embodiment of the invention.

Further, according to another aspect of the invention, for a large and complex circuit, instead of capturing activity information of all signals during the hardware accelerated emulating or prototyping, the circuit is partitioned into multiple blocks. Only a small set of key signals such as the activity data of group flops and boundary information are captured by the hardware. For each group of signals a small memory is connected to an address which is formed by concatenating the previous state (e.g., bus "PREV STATE" as shown in FIG. 19A) and next state (e.g., bus "NEXT STATE" as shown in FIG. 19A) of the group. Each clock cycle the addressed location is incremented, capturing both the state probabilities and the state to state transition rates (e.g., block 0002 as shown in FIG. 19A). In the case that the number of bits in the group is too large, it is possible to compress the index by mapping a large number of low probability states to one code (e.g., block 0001 as shown in FIG. 19A). For example suppose that 12 states out of 250 are highly probable, then the remaining 250−12=238 states can be mapped to a single code, yielding a 4 bit index instead of 8 bits. By using the statistical formal analysis methods described throughout this application, the captured information can be propagated through the circuit and the activity data can be calculated for each signal. In comparison with a conventional method, this technique makes the on-board emulator/prototyping faster and much less area overhead.

FIG. 1 is a flow diagram illustrating an example of a process for an activity analysis according to one embodiment of the invention. Note that process 100 may be performed by processing logic which may include software, hardware, or a combination of both. Referring to FIG. 1, at block 101, a netlist is received, where the netlist represents a circuit or a block of cells of at least a portion of a circuit associated with an IC being designed. The netlist may be an RTL netlist generated from a HDL compiler based on an input file written in the HDL programming language. The netlist typically includes multiple nets or nodes among the cells. At block 102, processing logic traverses the netlist to mark a logic level (e.g., logical level of 1 or 0) for each of the nets of the netlist.

In one embodiment, the processing logic starts with an input side of the netlist and "walks through" each net towards an output side of the netlist. One of the purposes of such a "walk through" is to decide a sequence order for subsequent propagation of state and transition probabilities through the circuit. According to one embodiment, all primary inputs and flops are assigned with a level 0 having an initial state probability of 0.5 and an initial transition probability of 0.2 by default or other values by the user. All other nets are assigned with a level corresponding to their fan-ins (e.g., number of inputs of a logic gate) as a maximum level.

At block 103, processing logic performs a statistical formal analysis on each combinational circuit (also referred to as combinational logic) according to the assigned logic levels. During the statistical formal analysis, processing logic propagates the state and transition probabilities for all of the combinational circuits within the netlist. In one embodiment, such propagation is performed by traversing nodes of a data structure such as a BDD (binary decision diagram) tree, where each node of the data structure represents a net of the netlist or other Boolean methods.

A BDD is a data structure that is used to represent a Boolean function. A Boolean function can be represented as a rooted, directed, acyclic graph, which consists of decision nodes and two terminal nodes called 0-terminal and 1-terminal. Each decision node is labeled by a Boolean variable and has two child nodes called low child and high child. A path from the root node to the 1-terminal represents a (possibly partial) variable assignment for which the represented Boolean function is true. As the path descends to a low child (high child) from a node, then that node's variable is assigned to 0 (1). BDDs are extensively used in CAD (computer-aid design) software to synthesize circuits and in formal verification. Every arbitrary BDD can be directly implemented by replacing each node with a 2-to-1 multiplexer; each multiplexer can be directly implemented by a 4-LUT (lookup table) in a FPGA (field programmable gate array). Note that throughout this application, a BDD tree is used as an example of a data structure for a propagation process of activity analysis. The techniques described in these embodiments are not limited to BDD based function representations, many other suitable function representations are available including PLAs, truth tables, and -inverter graphs and others.

Referring back to FIG. 1, at block 104, a statistical formal activity analysis is performed on each of the sequential circuits (also referred to as sequential logic) within the netlist. During this analysis, state and transition probabilities of flops or groups of flops of the sequential circuits are updated. In one embodiment, for a flop or a group of flops that do not have a feedback loop, the state and transition probabilities are copied from the input nets to its corresponding output nets. For a flop/or a group of flops having a feedback loop and/or a side-cut support, the sequential circuit is unrolled for a predetermined number of times to represent the difference. A side-cut support is related to a signal that does not come from a feedback loop. Thereafter, the processing logic updates the state and transition probabilities using a BDD tree or other Boolean logic methods and taking into account of temporal and spatial correlations. Operations of blocks 103-104 may be performed repeatedly until a predetermined condition is satisfied, which may be user configurable. In one embodiment, iterations are performed until state and transition probabilities are converged. A state probability is converged when the state probabilities between two consecutive iterations is smaller than a predetermined threshold. Similarly, a transition probability is converged when the transition probabilities of two consecutive iterations is within a predetermined range.

As described above, the purpose of a circuit switching activity analysis is, given state and transition probabilities of all inputs of a circuit, to provide state and transition probabilities of all internal signals and all outputs of the circuit. An activity analysis includes an activity analysis for a combinational circuit and an activity analysis for a sequential circuit.

A sequential circuit or logic is a type of logic circuit whose output depends not only on the present input but also on the history of the input. This is in contrast to a combinational circuit or logic, whose output is a function of, and only of, the present input. In other words, sequential logic has storage (e.g., memory) while combinational logic does not. Sequential logic is therefore used to construct some types of computer memory, other types of delay and storage elements, and finite state machines. Most practical computer circuits are a mixture of combinational and sequential logic. The basic storage element in sequential logic is a flip-flop (simply referred to as a flop).

Activity Analysis for Combinational Circuits

Figure 2A:
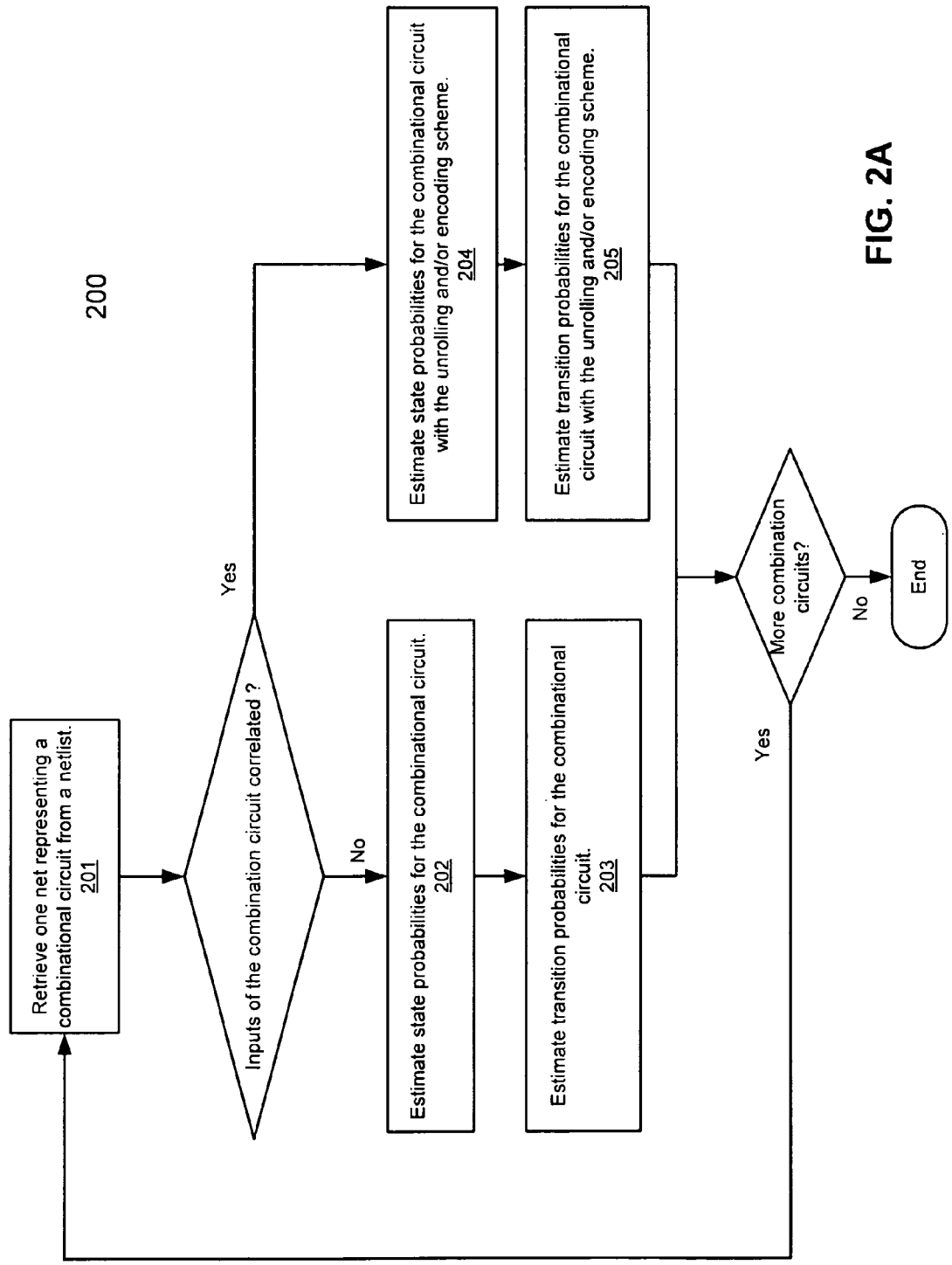
FIG. 2A is a flow diagram illustrating a process for performing an activity analysis for a combinational circuit according to one embodiment of the invention.

FIG. 2A is a flow diagram illustrating a process for performing an activity analysis for a combinational circuit according to one embodiment of the invention. Note that process 200 may be performed by processing logic which may include software, hardware, or a combination of both. Referring to FIG. 2A, at block 201, a net representing a combinational circuit is retrieved from a netlist and inputs of the combinational circuit are evaluated. If the inputs of the combination circuit are correlated (e.g., part of inputs from an output of a sequential circuit represented by the netlist), at block 204, state probabilities of the combination circuit are estimated, and transition probabilities of the combinational circuit is estimated at block 205, using unrolling and encoding techniques, which will be described further below. If the inputs of the combination circuit are not correlated, at block 202, state probabilities of a combinational circuit are estimated. In one embodiment, for each net of a combinational circuit output, a state probability of each gate output is calculated, for example, by traversing a BDD representation of the net, and summing all probabilities of a path with a leaf node having a logical true value. This is equivalent to rewriting the function as the sum of a set of disjoint product terms, computing the probabilities of the product terms as the product of the probabilities of their variable states and them summing across all product terms. A breadth-first search (BFS) algorithm may be utilized to find a cut under a boundary of a maximum number of variables, maximum number of depth, or hitting a primary input. BFS is a graph search algorithm that begins at the root node and explores all the neighboring nodes. Then for each of those nearest nodes, it explores their unexplored neighbor nodes, and so on, until it finds the goal.

Referring back to FIG. 2A, at block 203, a transition probability of the combinational circuit is estimated. In one embodiment, an output transition probability is computed from the state and transition probabilities of inputs. This is more complicated than it seems at first because a next state is correlated with a current state (e.g., they are dependent). In one embodiment, to compute the output transition probability, such a problem is converted into a problem similar to a static probability problem. According to a particular embodiment, a function is defined as follows:

$$G=F(V)\hat{\ }F(V\hat{\ }T)$$

Here ^ represents the vector XOR operation. Bits of T being 1 represents enabling a transition on corresponding bits of V. That is, when $T(i)=1$, $V(i)\hat{\ }T(i)=\text{NOT } V(i)$. When $T(i)=0$, $V(i)\hat{\ }T(i)=V(i)$. Therefore, $F(V\hat{\ }T)$ represents the next state. Here F is a logic function of a signal; V is a set of input signals; and G represents a logic function which is true when a transition of function F occurs.

Figure 2B:
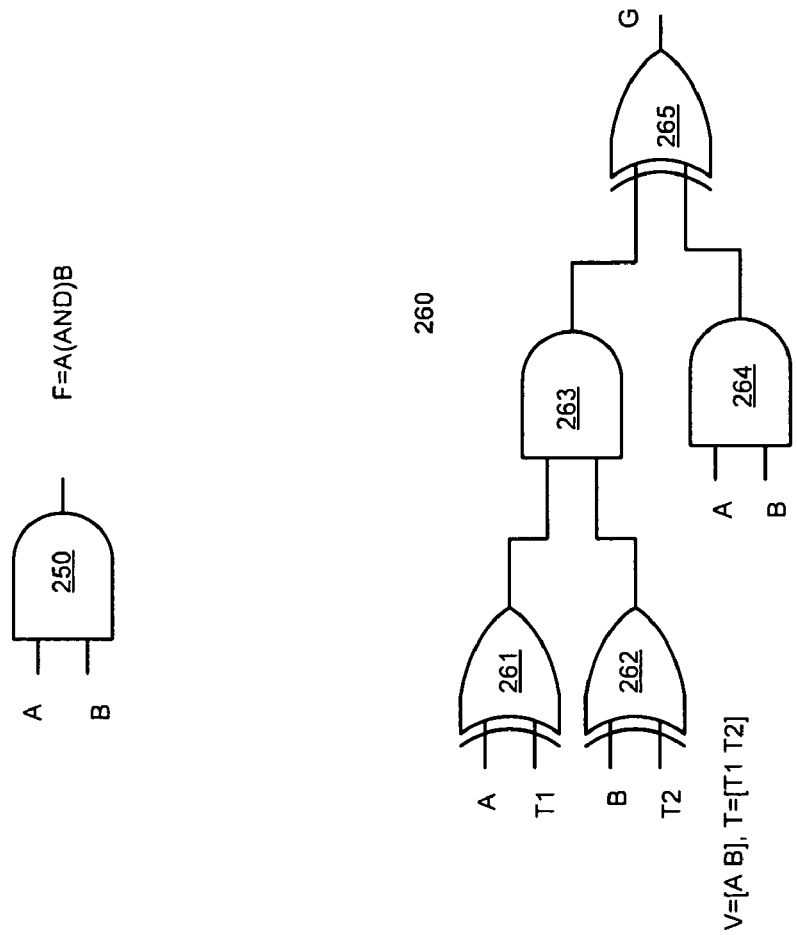
FIG. 2B is a block diagram illustrating a combinational circuit example.

Similarly, function G can be composed such that G=1 if there is a transition from F(V) to $F(V\hat{\ }T)$; otherwise, G will be 0. In this way, the transition probability problem is converted into a state probability problem. Given that the probability of $T(i)==1$, dependent upon the state of V(i), the T(i) variable can be placed just below the V(i) variable in a BDD representation. The problem of P(G==1) can be solved in a similar way in the state probability calculation. In one embodiment, processing logic has to compute the V/T variable levels together and only caches in a positive form at the V levels. In this situation, there are four cases here when traversing the BDD representation for each variable:

0→0: was 0, stays 0
0→1: was 0, enable transition, rising edge
1→0: was 1, stays 1
1→1: was 1, enable transition, falling edge For example, as shown in FIG. 2B, an AND gate logic 250 can be represented in logic 260 for the purpose of calculating probabilities. Here, AND gate 264 is a function F(V). Logic 261-263 represent $F(V\hat{\ }T)$, where ^ represents an XOR logic. For AND gate 250, there are two inputs A and B. The state probability of logic 261 is determined based on the state probability A and its transition probability T1. The state probability of logic 262 is determined based on the state probability B and its transition probability T2. The final transition probability G can be determined based on the state probabilities of logic 263 and 264, which is represented by $G=F(V)\hat{\ }F(V\hat{\ }T)$ as set forth above.

Activity Analysis for Sequential Circuit with Temporal Correlation

As mentioned above, a sequential circuit or logic is a type of logic circuit whose output depends not only on the present input but also on the history of the same input (e.g., correlation inputs). A typical sequential circuit includes a feedback loop coupling its output to its input. A sequential circuit can be represented by a combinational circuit with a feedback loop. In order to perform an activity analysis on a sequential circuit, state probabilities and transition probabilities have to be determined.

Note that a flip-flop itself does not change the logic value. Instead, a flip-flop just stores a value. Thus, to calculate a state probability of a single flop without a feedback loop, the state probability of an input net can simply copied to its output net. However, the calculation of state probability for a single flop having a feedback loop will be different.

Figure 3:
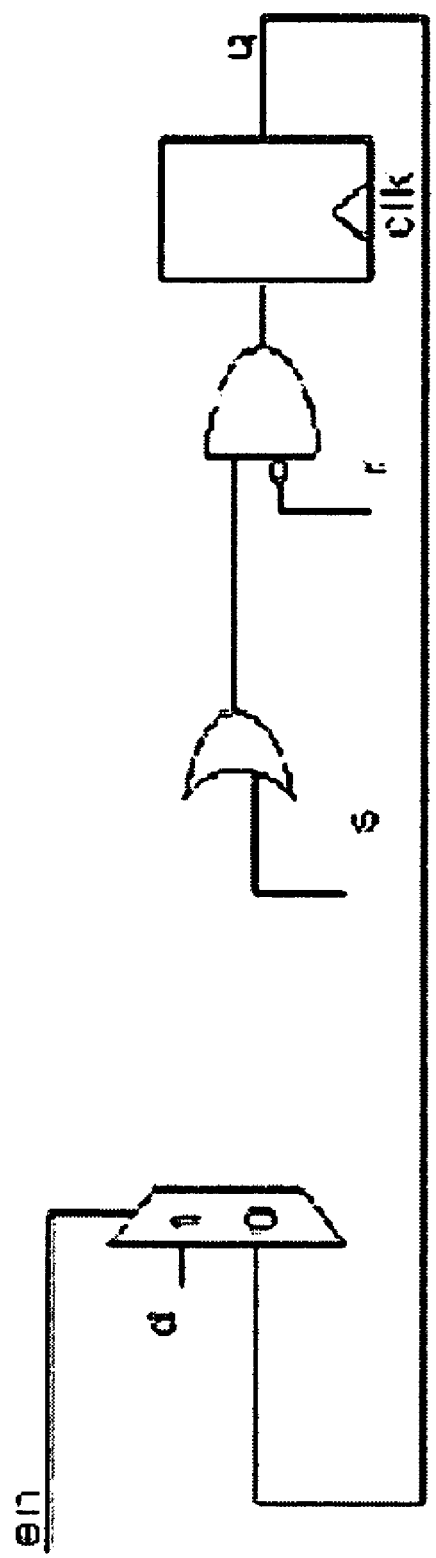
FIG. 3 is a schematic diagram illustrating a typical gate logic.

Note that equivalent logic gates such as the one as shown in FIG. 3 can be used to represent a flop having a reset signal, a set signal, and an enable signal. According to one embodiment, the following equation can be used to calculate state probability of most flops: $P_1=((1.0-p\_r)*(p\_s+(1.0-p\_s)*p\_en*p\_d)/(1-(1.0-p\_s)*(1.0-p\_en)*(1.0-p\_r))$. Here p_r represents a probability of the reset pin; p_s represents a probability of the set pin; and p_en represents a probability of the enable pin. Note that for the purpose of illustration, $P_0$ represents a state probability of a signal at logical level 0 while $P_1$ represents a state probability of a signal at logical level 1, where $P_1+P_0=1$.

According to one embodiment, in order to determine transition probabilities of a sequential circuit, the sequential circuit is unrolled into multiple stages (e.g., multiple copies) in series, also referred to as unrolled circuits or logic herein. In addition, a correlation network is designed and coupled to each unrolled circuit to introduce temporal correlations on inputs of each unrolled circuit.

Figure 4A:
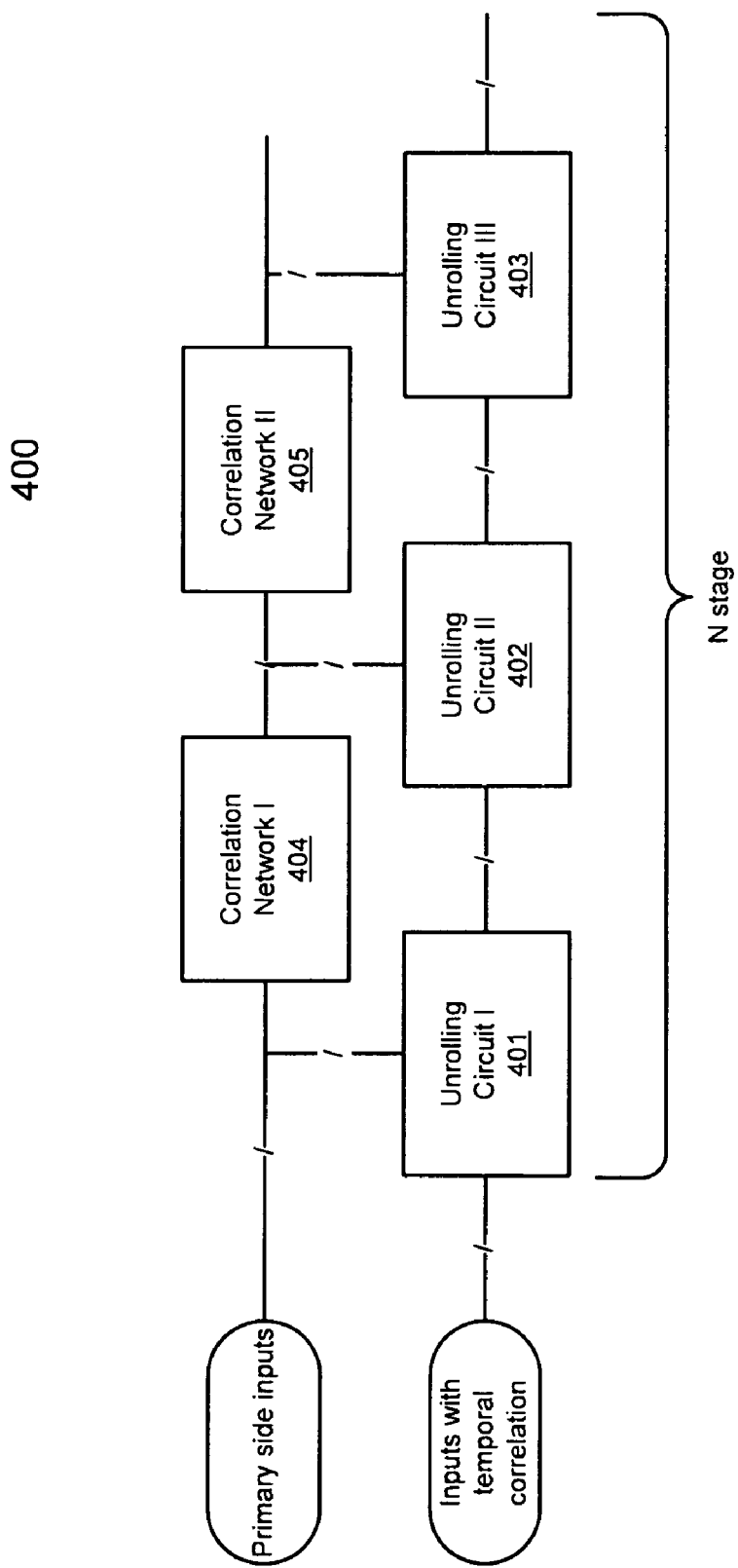
FIG. 4A is a block diagram illustrating an example solution for solving temporal correlation according to one embodiment of the invention.

FIG. 4A is a block diagram illustrating an example solution for solving a temporal correlation according to one embodiment of the invention. Referring to FIG. 4A, a sequential circuit is unrolled into multiple stages (e.g., N stages or N depth) 401-403. For the purpose of illustration, only three stages are shown in FIG. 4A. However, it is not so limited, more or fewer stages may be implemented. In addition, a correlation network (e.g., correlation networks 404-405) is attached to each stage to introduce temporal correlation to an input of each stage. In this example, correlation network 404 is configured to introduce temporal correlation to an input of unrolled circuit 402 while correlation network 405 is configured to introduce a temporal correlation to an input of unrolled circuit 403, etc.

According to one embodiment, referring to FIG. 4A, it is assumed that $F_0=G(S_0, S_1, \ldots S_j, O_0, O_1, \ldots O_k)$ is a function of a combination circuit having a feedback loop. $S=(S_0, S_1, \ldots S_j)$ are side support nets. $O=(O_0, O_1, \ldots O_k)$ are feedback nets. $F_i=G(C(S_0), C(S_1), \ldots C(S_j), F_{i-1})$ is a function of an unrolled circuit with "i" depth. Function $C(S_0)$ mimics a correlation of input signal $S_0$ in a time domain (e.g., temporal correlation). In one embodiment, a base function of C is a BDD representation of a multiplexer (MUX):BddMux ($t_r$, $t_f$, $S_0$), where $t_r$ and $t_f$ are the signals made from the statistical data of signal $S_0$, i.e. the state probability of $t_r$ is the rising transition probability of signal $S_0$ and the state probability of $t_f$ is the falling transition probability of signals $S_0$ Note that for the purpose of illustration, according to one embodiment, transition rate T represents a probability of a signal switching from logic 0 to logic 1 or from logic 1 to logic 0 between two consecutive clock cycles. The $t_r$ represents a probability of a rising transition, where $t_r=T/2P_0$. The $t_f$ represents a probability of a falling transition, where $t_f=T/P_1$. The number of rising transitions equals to the number of falling transitions: $P_0*t_r=P_1*t_f=T/2$. Transition rate T should be less than or equal to twice of minimum of $P_0$ or $P_1$:$2*Min(P_0, P_1)$.

Figures 4B, 4C:
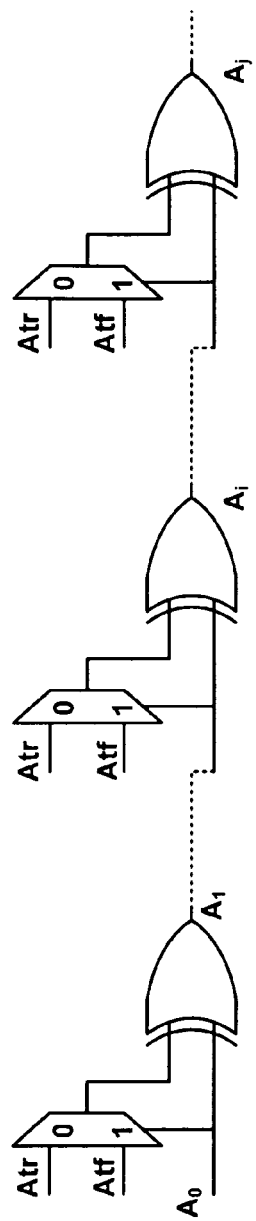
FIG. 4B is a truth table representing a correlation network according to one embodiment of the invention.
FIG. 4C is a schematic diagram illustrating an example of a correlation network according to one embodiment of the invention.

According to one embodiment, the above correlation network of each signal can be represented by a truth table as shown in FIG. 4B. Referring to FIG. 4B, the truth table represents a key component that introduces the temporal correlation for primary input $A_0$. Here $A_0$ represents signal A at timeframe 0 while $A_1$ represents signal A at timeframe 1. Atf represents a falling switching activity (e.g., from logical level 1 to 0) of signal A. Atr represents a rising switching activity (e.g., from logical level 0 to 1) of signal A. The truth table describes the temporal correlation logic between $A_0$ and $A_1$. As can be seen from the truth table of FIG. 4C, when a current state is at a logical level of zero (e.g., low logical level), a rising switching activity will transition the current state to a logical level of one at the next state. However, a falling switching activity will not change the current state in the next time frame, since the current state has already been at a logical level of zero and thus in effect, the falling switching activity is ignored in this situation. Similarly, when the current state is at a logical level one (e.g., high logical level), a falling switching activity will transition the current state to a logical level of zero at the next state. However, a rising switching activity will not change the current state in the next time frame, since the current state has already been at a logical level of one and thus in effect, the rising switching activity is ignored in this situation.

We give the following proof to demonstrate the introduced correlation logic will not change the statistical property of the signal in each timeframe, but will add the temporal correlations between every two consecutive timeframe of the same signal. In order to verify the state probabilities, from the truth table, we can find that there are four possible combinations that will allow signal $A_1$ to be logic 1. These four combinations can be written in two product terms. Therefore, the probability of $A_1$ to be logic 1 is the sum of the disjoint probability of these two product terms listed as following equation:

$$P(A_1) = P(Atr) * \overline{P(A_0)} + \overline{P(Atf)} * P(A_0) =$$
$$\frac{\tau(A_0)}{2} + (1 - P(Atf)) * P(A_0) = \frac{\tau(A_0)}{2} + P(A_0) - \frac{\tau(A_0)}{2} = P(A_0)$$

Here, we prove that the state probability of $A_0$ and $A_1$ are the same.

In order to verify the transition probabilities, similar to the proof of state probabilities, we can get the transition probability of $A_1$ as the sum of the probabilities of two disjoint product term:

$$T(A_1) = P(Atr) * \overline{P(A_0)} + P(Atf) * P(A_0) = \frac{T(A_0)}{2} + \frac{T(A_0)}{2} = T(A_0)$$

Here, we prove that the transition probability of $A_0$ and $A_1$ are the same.

From the above proofs, it can be determined that the signal $A_1$ has the same state and transition probabilities as signal $A_0$, i.e. signal $A_1$ and $A_0$ represents the same signal but in different timeframe with temporal correlation between each other. This conclusion can be further generalized as $P(A_i)=P(A_j)$, i.e., the state probability of any two timeframes will be the same. FIG. 4C is one of the possible logic diagrams illustrating the temporal correlation network based on the truth table in FIG. 4B.

Figure 5:
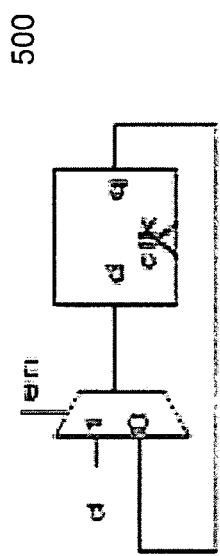
FIG. 5 is a schematic diagram illustrating a representation of a sequential circuit having a feedback loop.

FIG. 5 is a schematic diagram illustrating a representation of a sequential circuit having a feedback loop. In this example, circuit 500 includes a MUX and a flop. The flop will load it's output q with the value of input d when the signal en is true; otherwise, output q will not change. Thus, there is a temporal correlation. According to one embodiment, in order to determine transition probabilities for circuit 500, circuit 500 is unrolled multiple times.

Figure 6:
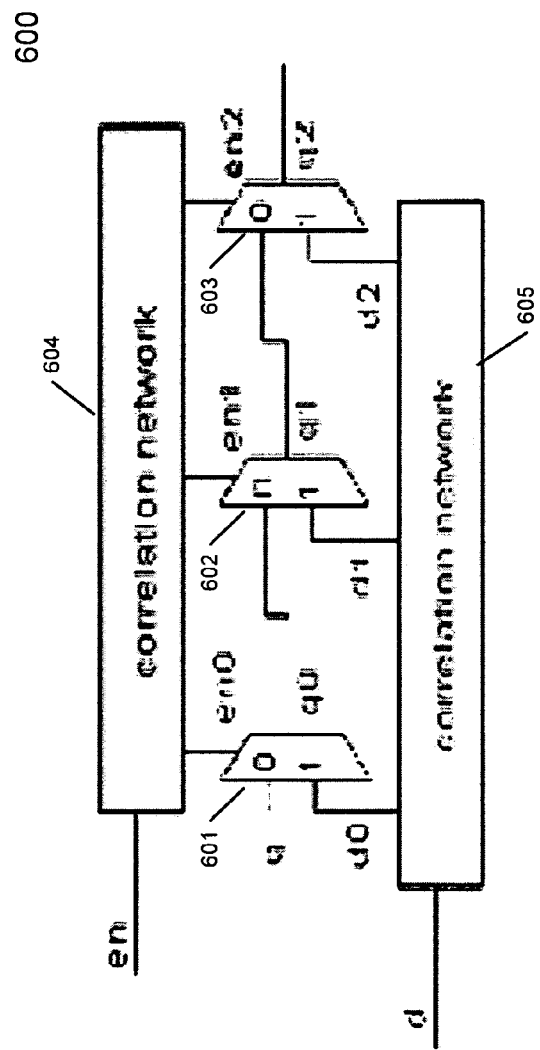
FIG. 6 is a schematic diagram illustrating an unrolled sequential circuit with correlation networks according to one embodiment of the invention.

FIG. 6 is a schematic diagram illustrating an unrolled sequential circuit with correlation networks according to one embodiment of the invention. Referring to FIG. 6, in this example, circuit 500 of FIG. 5 is unrolled three times to represent the sequential circuit in timeframe 0, 1, and 2. Each unrolled circuit includes all of the combinational part within the sequential circuit (a MUX in circuit 500). Three unrolled circuits are coupled in series, where an output of a current unrolled circuit is coupled to an input of a next unrolled circuit. The unrolled circuits (also referred to as an unrolled network) can be represented via a BDD tree or other equivalent logic data structure. In addition, a correlation network is attached to each input of the unrolled circuit to introduce a temporal correlation of the correspondent inputs between the two consecutive unrolled circuits. In this example, correlation network 604 is attached to the unrolled circuits to introduce the temporal correlation between the different timeframe of the signal "en" (e.g., en0, en1, and en2 represents signal "en" in timeframe 0, 1, and 2). Similarly, correlation network 605 is attached to the unrolled circuits to introduce the temporal correlation to the primary input signal "d" at different timeframe (e.g., d0, d1, and d2 represents signal "d" in timeframe 0, 1, and 2).

Figure 7:
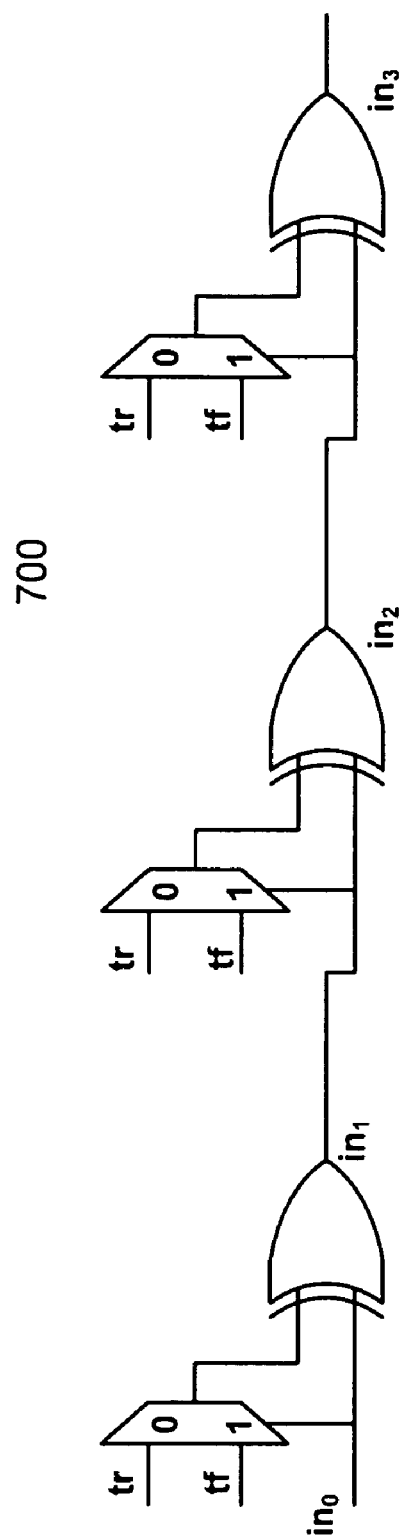
FIG. 7 is a schematic diagram illustrating a correlation network according to one embodiment of the invention.

FIG. 7 is a schematic diagram illustrating a correlation network of any correlated signal in different timeframe according to one embodiment of the invention. For example, correlation network 700 may be implemented as a part of correlation networks 604 and/or 605 of FIG. 6. In this example, for the purpose of illustration, correlation network 700 includes three sub-networks, one for each unrolled circuit of FIG. 6. Each sub-network includes a MUX, an XOR gate and two introduced input variables who's statistics are used to control the transition rate. Inputs of the MUX represent a rising transition tr and a falling transition tf. An output of the MUX is coupled to an input of the XOR gate. The primary input (e.g., in0, in1, and in2) is coupled to an enable pin of the MUX and the other input of the XOR gate. The purpose of a correlation network is that given a current state of a primary input of a current unrolled circuit and the switching transitions (e.g., tr and tf) of the primary input, a next state of the primary input is predicted, which is used to introduce temporal correlation to an input of a next unrolled circuit.

According to one embodiment, a correlation network may be supported via a truth table as shown in FIG. 4B. For example, when correlation network 700 is implemented as a part of correlation network 605 of FIG. 6, signal in0 represents input d0 of FIG. 6; signal in1 represents input d1 of FIG. 6; and signal in2 represents input d2 of FIG. 6. For the purpose of illustration, given a primary input in0 (e.g., input d or d0 in FIG. 6), d1 is determined based on rising switching tr and falling switching tf of signal in0.

This determination can be performed based on logic represented by the truth table as shown in FIG. 4B. For example, referring to FIGS. 4B and 7, if the current state of input in0 (e.g., currently state of A in FIG. 4B) is at logical level 0 while both rising switching activity tr and falling switching activity tf are 0, the next state of signal in0 (e.g., in1) is 0 based on the truth table of FIG. 4B. Similarly, if the current state of input in0 (e.g., currently state of A in FIG. 4B) is at logical level 1 while both rising switching activity tr and falling switching activity tf are 1, the next state of signal in0 (e.g., in1) is 0 based on the truth table of FIG. 4B. As a result, referring back to FIG. 6, input d1 is dependent upon d0, as well as switching activities of d0. Thus, input d1 is determined in consideration of the temporal correlation.

Referring back to FIG. 7, with the correlation network as shown in FIG. 7, we can determine the state probability of signals in0, in1, tr, and tf, which have the following relationships based on the truth table in FIG. 4B:

$$P(tr) = \frac{T(in0)}{2\overline{P(in0)}} \quad P(tf) = \frac{T(in0)}{2P(in0)}$$

$$P(in1) =$$

$$P(tr) * \overline{P(in0)} + \overline{P(tf)} * P(in0) = \frac{T(in0)}{2} + (1 - P(tf)) * P(in0) = P(in0)$$

$$T(in1) = P(tr) * \overline{P(in0)} + P(tf) * P(in0) = \frac{T(in0)}{2} + \frac{T(in0)}{2} = T(in0)$$

Based on the above calculation, it is determined that signals in0 and in1 have the same state and transition probabilities. Similarly, it can be proved that signals in1 and in2 have the same state and transition probabilities. Therefore, this correlation network allows modeling the temporal correlation in the unrolled circuit.

Figure 8:
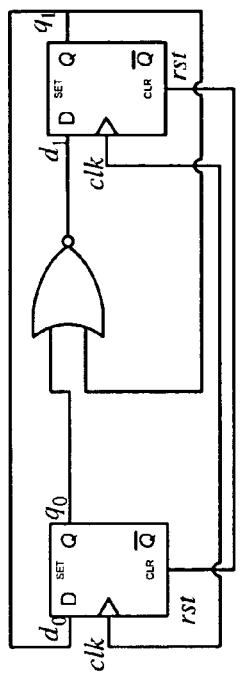
FIG. 8 is a schematic diagram illustrating another example of a sequential circuit having a feedback loop.
Figure 9:
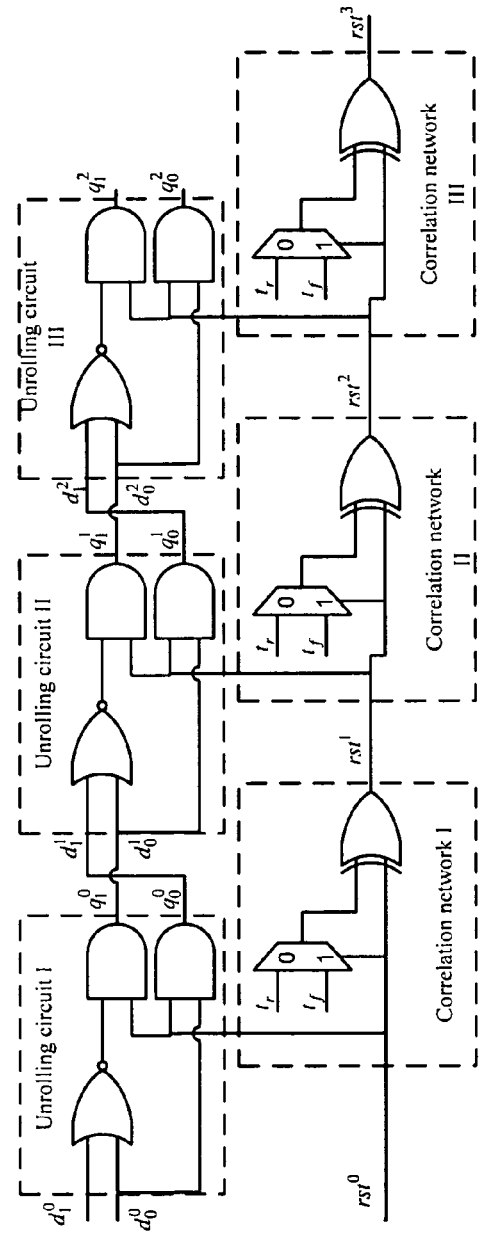
FIG. 9 is a schematic diagram illustrating an unrolled circuit with a correlation network according to one embodiment.

FIG. 8 is a schematic diagram illustrating another example of a sequential circuit having a feedback loop. In this example, sequential circuit 800 includes a NOR gate and two flops. Using the techniques described above, circuit 800 can be unrolled multiple timeframes by removing the flops as shown in FIG. 9. In this example, referring to FIG. 9, circuit 800 is unrolled three times, where each unrolled circuit includes a NOR gate and two AND gates. In addition, three correlation networks are attached to introduce temporal correlations to an input of each unrolled circuit.

Figure 10:
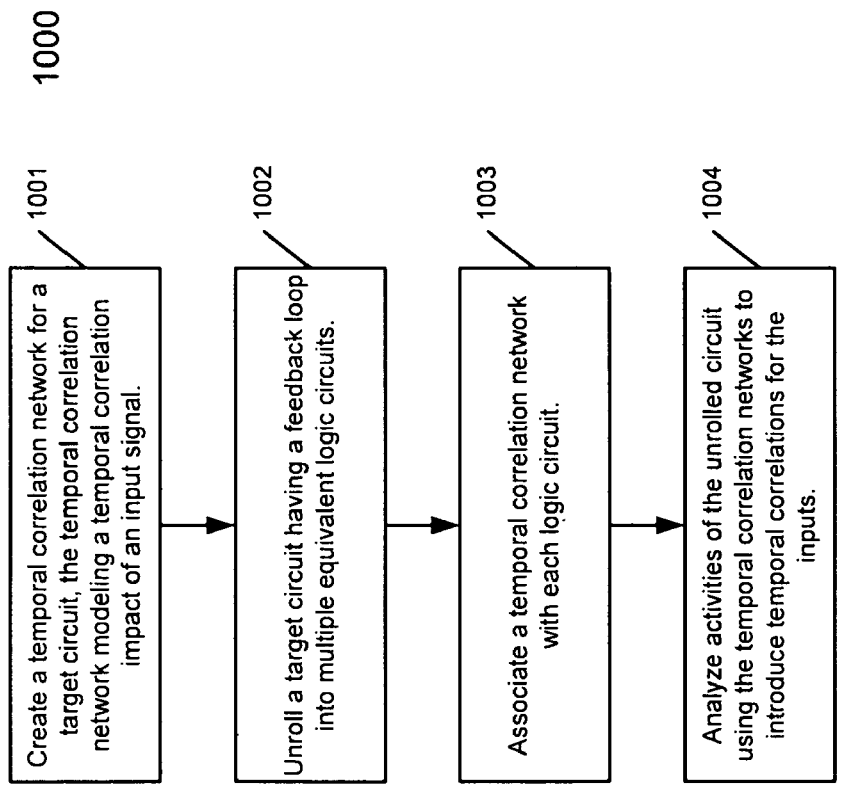
FIG. 10 is a flow diagram illustrating a process for an activity analysis on a sequential circuit with temporal correlation according to one embodiment of the invention.

FIG. 10 is a flow diagram illustrating a process for an activity analysis on a sequential circuit with a temporal correlation according to one embodiment of the invention. Note that process 1000 can be performed by processing logic which may include software, hardware, or a combination of both. Referring to FIG. 10, at block 1001, given a target circuit having a feedback loop to be analyzed, a correlation network is created, where the temporal correlation network models a temporal correlation impact to an input of a circuit. The correlation network is configured to, given a current state/current timeframe of an input of a current unrolled circuit in view of the rising and falling activities of the input, determine a next state/next timeframe of the input. The determined next state is applied as an input to a next unrolled circuit in consideration of a temporal correlation of the current unrolled circuit. In one embodiment, a correlation network is represented by a truth table similar to the one shown in FIG. 4B. At block 1002, the target circuit is unrolled into multiple equivalent logic circuits (e.g., unrolled circuits). At block 1003, a temporal correlation network is associated with each equivalent logic circuit. At block 1004, an activity analysis is performed on each unrolled circuit using the associated correlation network to introduce temporal correlation to an input of the corresponding unrolled circuit. Other operations may also be performed.

Activity Analysis for Sequential Circuit with Spatial Correlation

According to one embodiment, in addition to considering temporal correlations, spatial correlations of inputs are also considered during an activity analysis of a sequential circuit. Without the consideration of spatial correlations, the activity analysis of a sequential circuit would be incomplete.

For example, given a 2-bit FSM with 3 states ($s_0$:00, $s_1$:01, and $s_2$:10), as shown in FIG. 8, the FSM is configured to counts 0, 1, 2, and then starts over again (e.g., a counter). Both the state probability of each bit $P(b_i)$ and each state $P(s_i)$ are 1/3. However, it is not possible to derive $P(s_i)$ from $P(b_i)$. In the given example, $P(b_0)=P(b_1)=1/3$ and $P(s_0)=P(s_1)=P(s_2)=1/3$. Thus, $P(s_0)=(1-1/3)*(1-1/3)=4/9$ and $P(s_1)=P(s_2)=1/3*(1-1/3)=2/9$. As can be seen, the sum of probability of all the valid states (e.g., $P(s_0)$, $P(s_1)$, $P(s_2)$) is 8/9, which is not complete, also referred to as an incomplete set of states. As can be seen above, the state of 11 is an invalid state that is never reached by the 2-bit FSM (e.g., an unreachable state). An incomplete description cannot represent the spatial correlation between each signal, i.e., the joint probability of each state based on information of the state probability of each individual state bit (e.g., the sum of all the valid state probabilities is not equal to one).

According to one embodiment, an encoding scheme is designed to map an incomplete set of states into a complete set of states, by eliminating the invalid states, also referred to as unreachable states in an FSM. In one embodiment, an example of an encoding scheme can be represented by the following mapping table in view of the above FSM example.

| New Encoding | Old Encoding | State | Mapping of Probability |
|---|---|---|---|
| X1 | 00 | $s_0$ | $P(e_0) = P(s_0)$ |
| 10 | 01 | $s_1$ | $P(e_1) * P(!e_0) = P(s_1)$ |
| 00 | 10 | $s_2$ | $P(s_2) = 1 - P(s_0) - P(s_1)$ |

As shown in the above table, FSM state probability $P(s_i)$ is a joint probability of the bits in a re-encoding scheme. In this example, old state encoding 11 is an invalid state that we try to eliminate in the new state encoding. In view of the above table, we map both 01 and 11 to X1 as the state $s_0$, here X means don't care bit.

Figure 11A:
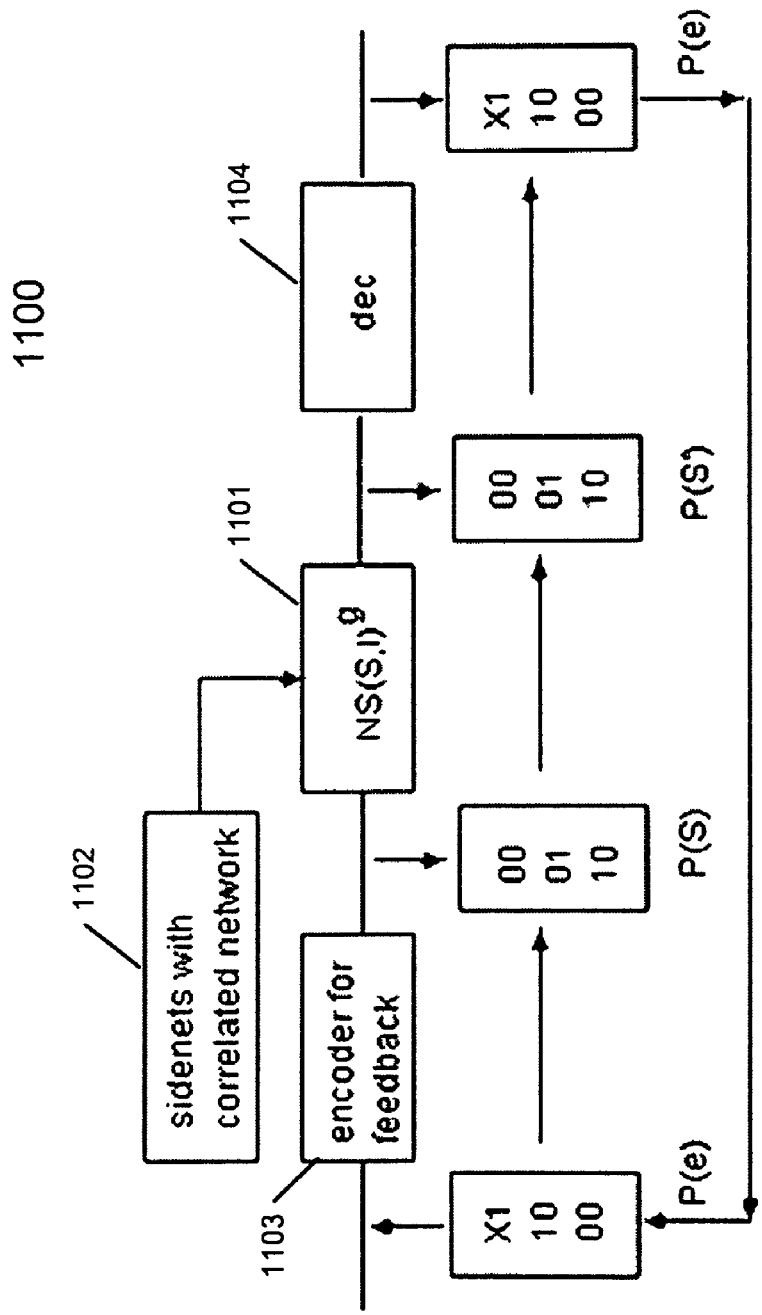
FIGS. 11A-11B are block diagrams illustrating a sequential circuit having an encoding scheme according to certain embodiments of the invention.

FIG. 11A is a block diagram illustrating a sequential circuit having an encoding scheme according to one embodiment. Referring to FIG. 11A, system 1100 includes a sequential circuit 1101 which may or may not be unrolled and a sidenet with a correlation network 1102. Assumed that the sequential circuit is a 2-bit FSM as shown in FIG. 8, circuit 1101 would have been unrolled into 3 stages. Accordingly, sidenet 1102 includes a temporal correlation network to introduce a temporal correlation in an input of each stage. In addition, an encoding scheme is utilized to introduce a spatial correlation to inputs of the sequential circuit as a whole. In one embodiment, the encoding scheme includes an encoder 1103 coupled to an input of the sequential circuit 1101 to map all possible states into a set of reachable states of the input, as not all states are reachable given a specific design. This in effect eliminates the invalid states.

Figure 11B:
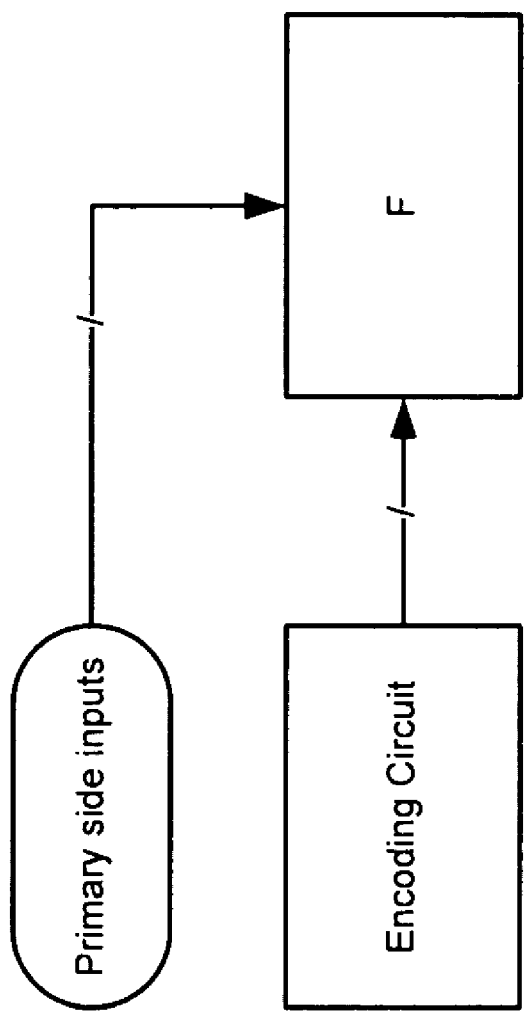

According to one embodiment, the encoding scheme further includes an optional decoder 1104 coupled an output of the sequential circuit 1101. An output of the decoder 1104 is fed back to an input of the encoder 1103. Encoder 1103 is configured to map state $P(e)$ to $P(s)$ and decoder 1104 is configured to map state $P(s)$ back to $P(e)$ before feeding it back to the encoder for iteration. Note that in order to introduce a spatial correlation to a circuit, only an encoder circuit is required, for example, as shown in FIG. 11B. A decoder circuit is required only when there is a need to repeat the unrolling which requires feeding the output of the unrolled circuit back into the input. With a feed back loop initiated from a decoder circuit, a circuit can be unrolled in fewer stages and the unrolling process can be iterated with less memory bandwidth.

According to one embodiment, for an n-bit FSM with m states, a (m−1)-bit encoding scheme can be utilized to map original states of the FSM. As a result, we can derive the correct probability of each bit by taking into account that some states are invalid. Specifically, the above mapping table can be used to derive a state probability of each encoding bit $P(e_i)$ iteratively. According to one embodiment, $P(e_i)$ can be obtained from the following formula:

$$P(e_i) = \frac{P(S_i)}{\prod_{j=0}^{i-1} P(\bar{e}_j)}$$

Figure 12:
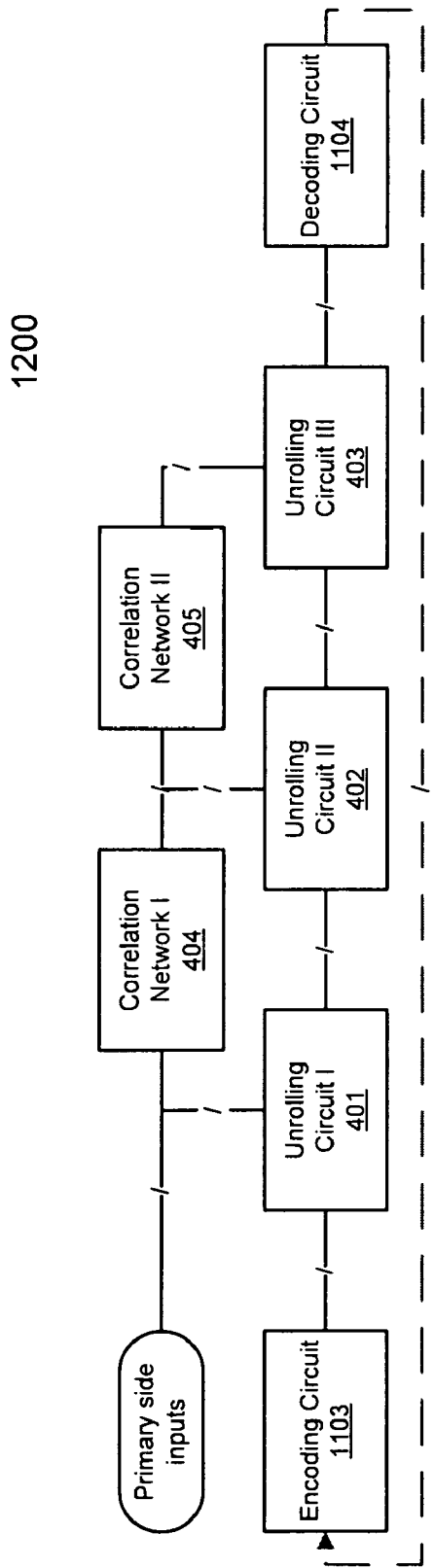
FIG. 12 is a block diagram illustrating an unrolled sequential circuit with both temporal correlation and spatial correlation according to one embedment of the invention.

FIG. 12 is a block diagram illustrating an unrolled sequential circuit with both temporal correlation and spatial correlation according to one embodiment of the invention. In this example, referring to FIG. 12, an encoding scheme described above is applied to a sequential circuit as shown in FIG. 4A. In this embodiment, an encoding scheme includes an encoding circuit and a decoding circuit. A decoding circuit is a reverse circuit of an encoding circuit. Outputs of the decoding circuit match inputs of the encoding circuit. According to one embodiment, the encoding scheme can enable the representation of joint probabilities of a group of signals. As a result, the encoding scheme improves both memory efficiency and activity analysis accuracy by iterating computation on the shallowly unrolling circuit.

According to one embodiment, the encoding scheme can be designed based on the following theories. Given an FSM with n reachable states (S) and m-bit encoding inputs (E), find an encoding scheme A is configured, such that the error bound (Err) is minimized and all the encoding inputs are independent from each other (i.e., all the $2^m$ combinations are mapped to one of the reachable states).

According to one embodiment, E can be defined as follows:

$$E=[e_a - e_{m-1}]^T$$

where each $e_i$ represents an encoding input bit. In addition, S can e defined as follows:

$$S=[s_0 \ldots s_{n-1}]^T$$

where each $s_i$ represents a reachable state. Further A can be defined as follows:

$$A = \begin{bmatrix} a_{0,0} & \cdots & a_{0,m-1} \\ \vdots & \ddots & \vdots \\ a_{n,0} & \cdots & a_{n-1,m-1} \end{bmatrix}$$

where $a_{ij}$ can be 0, 1, or d (don't care). Therefore, we define a relation between E and S as following:

$$\begin{bmatrix} a_{0,0} & \cdots & a_{0,m-1} \\ \vdots & \ddots & \vdots \\ a_{n,0} & \cdots & a_{n-1,m-1} \end{bmatrix} * \begin{bmatrix} e_0 \\ \vdots \\ e_{m-1} \end{bmatrix} = \begin{bmatrix} s_0 \\ \vdots \\ s_{n-1} \end{bmatrix}$$

Based on above equation, an equation can be derived as follows:

$$P'(s_i) = \sum_{j=0}^{m-1} a_{ij} P(e_j)$$

Here $P(e_j)$ is the state probability of input bit $e_j$, and $P'(s_i)$ represents the calculated state probability.

Since we can determine the exact state probability from FSM analysis for each reachable state, we can determine the following equation to measure the error from a point of view of state probability of reachable states when using the certain encoding scheme as follows:

$$Err = \sum_{i=0}^{n-1} (P(s_i) - P'(s_i))^2 = \sum_{i=0}^{n-1} \left( P(s_i) - \sum_{j=0}^{m-1} a_{ij} P(e_j) \right)^2$$

In addition, it is always true that the sum of the state probabilities of all reachable states is equal to 1:

$$\sum_{i=0}^{n-1} P(s_i) = 1$$

According to one embodiment, one of the encoding schemes is to set a matrix A as following:

$$A = \begin{bmatrix} 1 & 0 & \ldots & \ldots & 0 & 0 & 0 \\ d & 1 & \ldots & \ldots & 0 & 0 & 0 \\ \vdots & \vdots & \vdots & \vdots & \vdots & \vdots & \vdots \\ \vdots & \vdots & \vdots & \vdots & \vdots & \vdots & \vdots \\ d & d & \ldots & \ldots & 1 & 0 & 0 \\ d & d & \ldots & \ldots & d & 1 & 0 \\ d & d & \ldots & \ldots & \ldots & d & 1 \end{bmatrix}$$

Based on the above, it can be determined that:

$$P(e_i) = \frac{P(s_i)}{\prod_{j=0}^{i-1} P(\overline{e}_j)}$$

In this case, m=n−1, and Err=0. More details can be found in section 3.2.1 and 3.2.2

According to another embodiment, a general compact encoding scheme can be defined. Initially, all the reachable states are sorted in a decreasing order of the state probabilities. The first x states are assigned as the same as encoding scheme described above. As a result, we can derive that $$P(e_1) = \frac{P(s_i)}{\prod_{j=0}^{i-1} P(\overline{e}_j)}, \text{ where } i = 0, 1, \ldots x$$

The left (n-x) states are assigned using a compact encoding, where the matrix A can be represented as follows:

$$A = \begin{bmatrix} A_{00} & A_{01} \\ A_{10} & A_{11} \end{bmatrix}$$

$$A_{00} = \begin{bmatrix} d & d & \ldots & \ldots & d \\ d & d & \ldots & \ldots & d \\ \vdots & \vdots & \vdots & \vdots & \vdots \\ d & d & \ldots & \ldots & d \\ d & d & \ldots & \ldots & d \end{bmatrix} \quad A_{01} = \begin{bmatrix} \ldots & \ldots & \ldots & d & 1 \\ \ldots & \ldots & \ldots & 1 & 0 \\ \vdots & \vdots & \vdots & \vdots & \vdots \\ d & 0 & \ldots & 0 & 0 \\ 1 & 0 & \ldots & 0 & 0 \end{bmatrix}$$

$$A_{10} = \begin{bmatrix} 1 & 1 & \ldots & 1 & 1 \\ 0 & 1 & \ldots & 1 & 1 \\ \vdots & \vdots & \vdots & \vdots & \vdots \\ 1 & 0 & \ldots & 0 & 0 \\ 0 & 0 & \ldots & 0 & 0 \end{bmatrix} \quad A_{11} = \begin{bmatrix} 0 & 0 & \ldots & \ldots & 0 \\ 0 & 0 & \ldots & \ldots & 0 \\ \vdots & \vdots & \vdots & \vdots & \vdots \\ 0 & 0 & \ldots & \ldots & 0 \\ 0 & 0 & \ldots & \ldots & 0 \end{bmatrix}$$

The equation A*E=S can be further broken into the following two equations:

$$A_{01} * P\left( \begin{bmatrix} e_0 \\ \vdots \\ e_{x-1} \end{bmatrix} \right) = P\left( \begin{bmatrix} s_0 \\ \vdots \\ s_{x-1} \end{bmatrix} \right),$$

$$A_{10} * P\left( \begin{bmatrix} e_x \\ \vdots \\ e_{m-1} \end{bmatrix} \right) = P\left( \begin{bmatrix} s_x \\ \vdots \\ s_{n-1} \end{bmatrix} \right) \bigg/ \prod_{i=0}^{x-1} P(e_i)$$

The first equation can be solved using the same method as the first encoding scheme. The second equation can be solved using a standard matrix solver.

Figure 13:
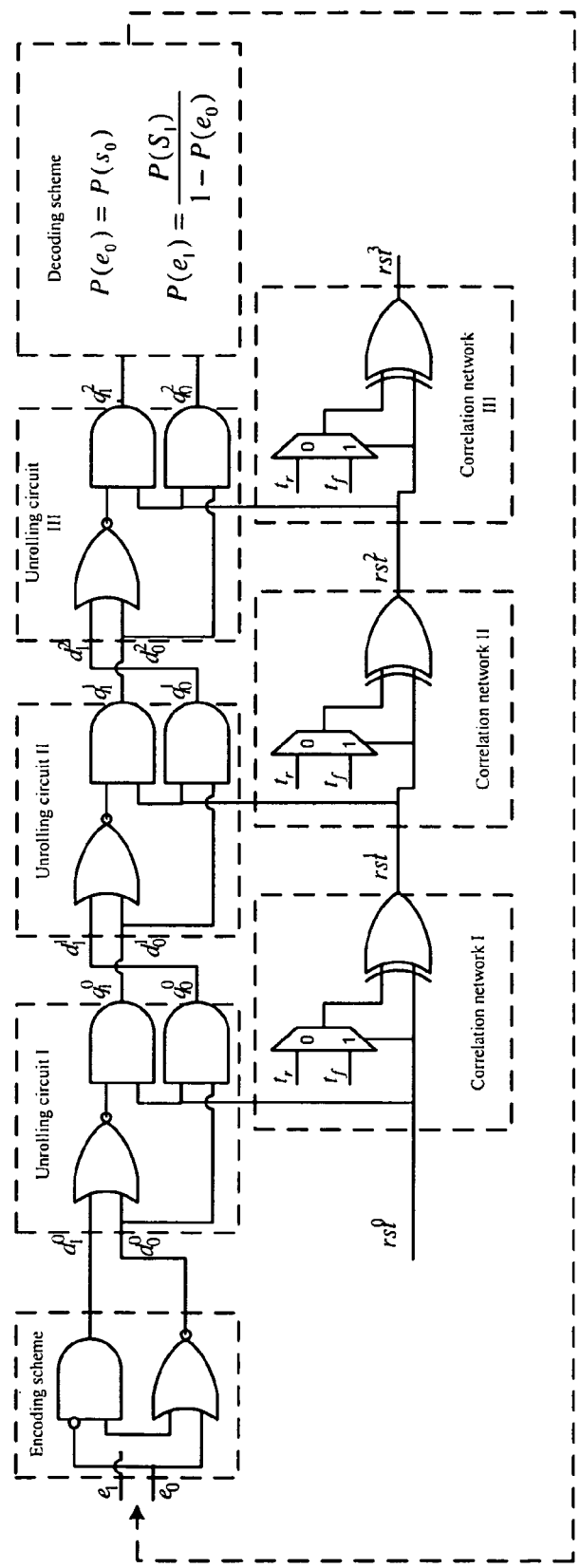
FIG. 13 is a schematic diagram illustrating a sequential circuit having an encoding scheme being applied to a circuit as shown in FIG. 9.

Note that an encoding scheme and a temporal correlation network work independently. They may not need each other, although they may work better jointly. FIG. 13 is a schematic diagram illustrating a sequential circuit having an encoding scheme being applied to a circuit as shown in FIG. 9.

Figure 14:
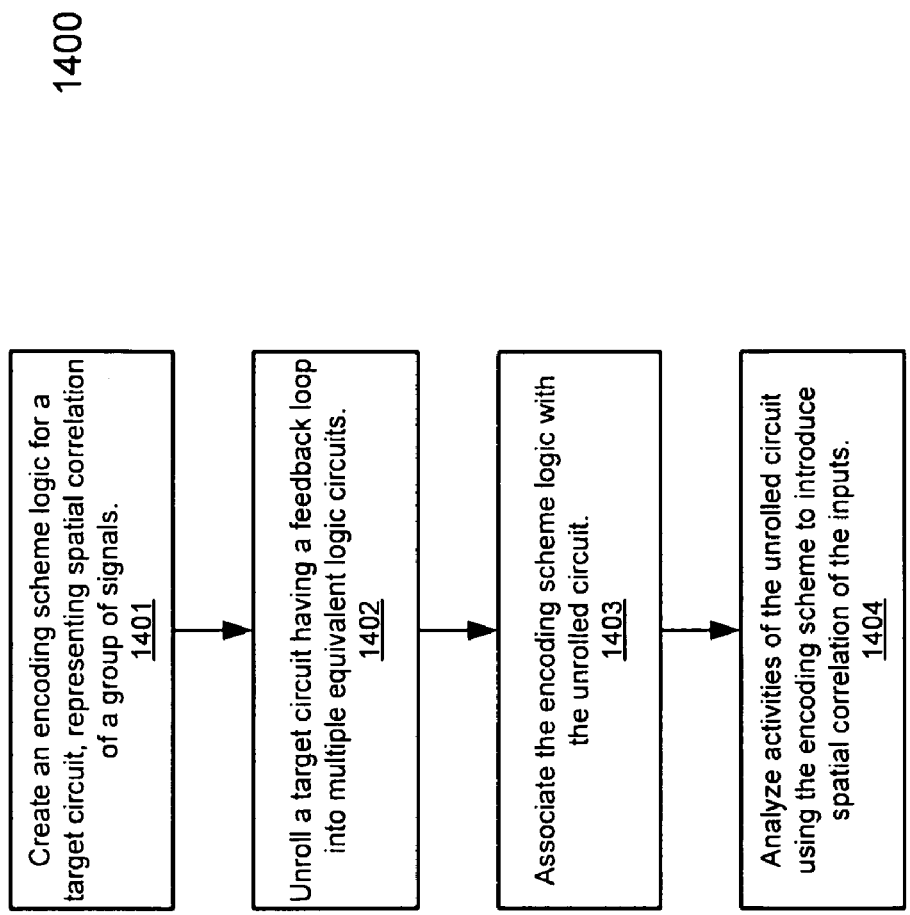
FIG. 14 is a flow diagram illustrating a process for activity analysis of a sequential circuit according to another embodiment of the invention.

FIG. 14 is a flow diagram illustrating a process for activity analysis of a sequential circuit according to another embodiment of the invention. Note that process 1400 can be performed by processing logic which may include software, hardware, or a combination of both. Referring to FIG. 14, at block 1401, an encoding scheme is created for a target circuit (e.g., a sequential circuit) representing a spatial correlation of a group of signals. At block 1402, the target circuit is unrolled into multiple unrolled circuits. At block 1403, the encoding scheme logic is associated with the unrolled target circuit. At block 1404, an activity analysis is performed on the unrolled target circuit using the encoding scheme to introduce a spatial correlation to an input of the unrolled target circuit.

As described above, a correlation network and an encoding scheme can be implemented individually and independently. A correlation network does not rely on an encoding scheme or vice versa. Alternatively, a correlation network and an encoding scheme can also work together to provide both temporal correlation and spatial correlation information during an activity analysis on a sequential circuit.

Figure 15:
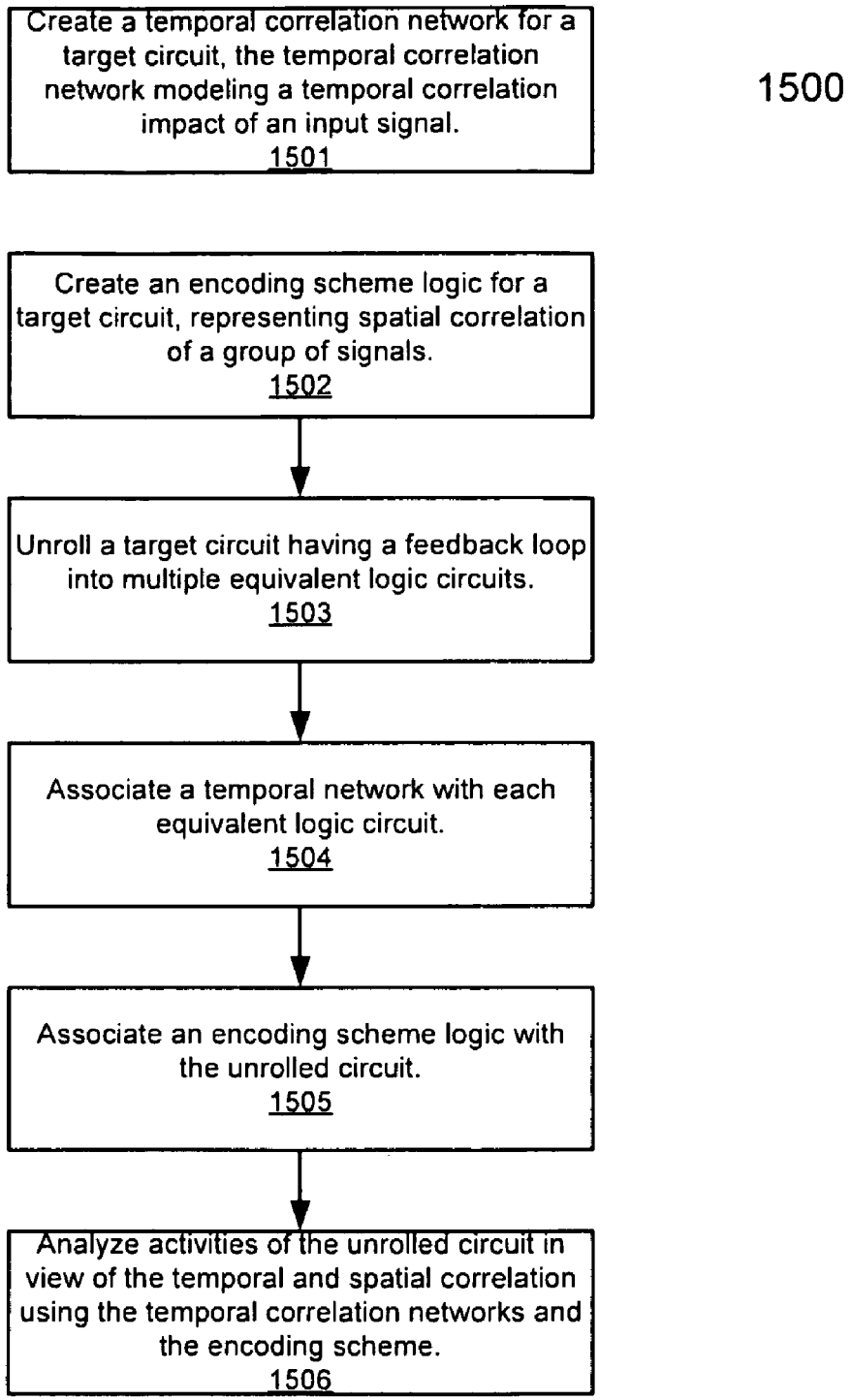
FIG. 15 is a flow diagram illustrating a process for activity analysis of a sequential circuit in consideration of both temporal and spatial correlations according to one embodiment of the invention.

FIG. 15 is a flow diagram illustrating a process for activity analysis of a sequential circuit in consideration of both temporal and spatial correlations according to one embodiment of the invention. Note that process 1500 may be performed by processing logic which may include software, hardware, or a combination of both. In this embodiment, both temporal and spatial correlations are introduced using a correlation network and an encoding scheme as described above substantially concurrently. Referring to FIG. 15, at block 1501, a temporal correlation network is created to model a temporal correlation applied to an input of a sequential circuit having a feedback loop. At block 1502, an encoding scheme is created representing a spatial correlation of a group of signals. At block 1503, a sequential circuit having a feedback loop is unrolled into multiple equivalent logic circuits. At block 1504, a temporal correlation network is associated with each equivalent logic circuit. At block 1505, encoding scheme logic is associated with the unrolled sequential circuit. At block 1506, activity analysis is performed on the unrolled sequential circuit in view of the temporal correlation and spatial correlation using the associated temporal correlation network and the encoding scheme. Other operations may also be performed.

As mentioned above, a flop does not change a value; instead, it stores a value. Thus, to calculate a transition probability of a single flop/or a group of flops without a feedback loop, according to one embodiment, a transition probability only needs to be copied from an input net to an output net. To calculate a transition probability of a single flop/or a group of flops with a feedback loop, according to one embodiment, the corresponding combinational circuit is unrolled into multiple stages and a correlation network is attached to each stage to introduce temporal correlation, as well as given the encoding scheme as described above, according to one embodiment, a converged state probability for an output of each register (e.g., storage element such as a flop) in an FSM as well as the converged state probability of each encoding bit $P(e_i)$ can be determined. Since every encoding bit $e_i$ is independent from any other encoding bits, a transition probability of each output of the unrolled circuit is equal to the state probability of an XOR representation of two consecutive time frame of the sequential circuit, which can be obtained by unrolling the sequential circuit. In other words, once the state probability has been determined (e.g., converged), a corresponding transition probability can be determined using a next state function. It is assumed that XOR is a representation of an exclusive OR:XOR ($F_i$, $F_{i-1}$). Thus, the state probability of the output of XOR is equivalent to the transition probability of $F_0$, as shown in FIG. 16, which will be described in details further below.

Figure 16A:
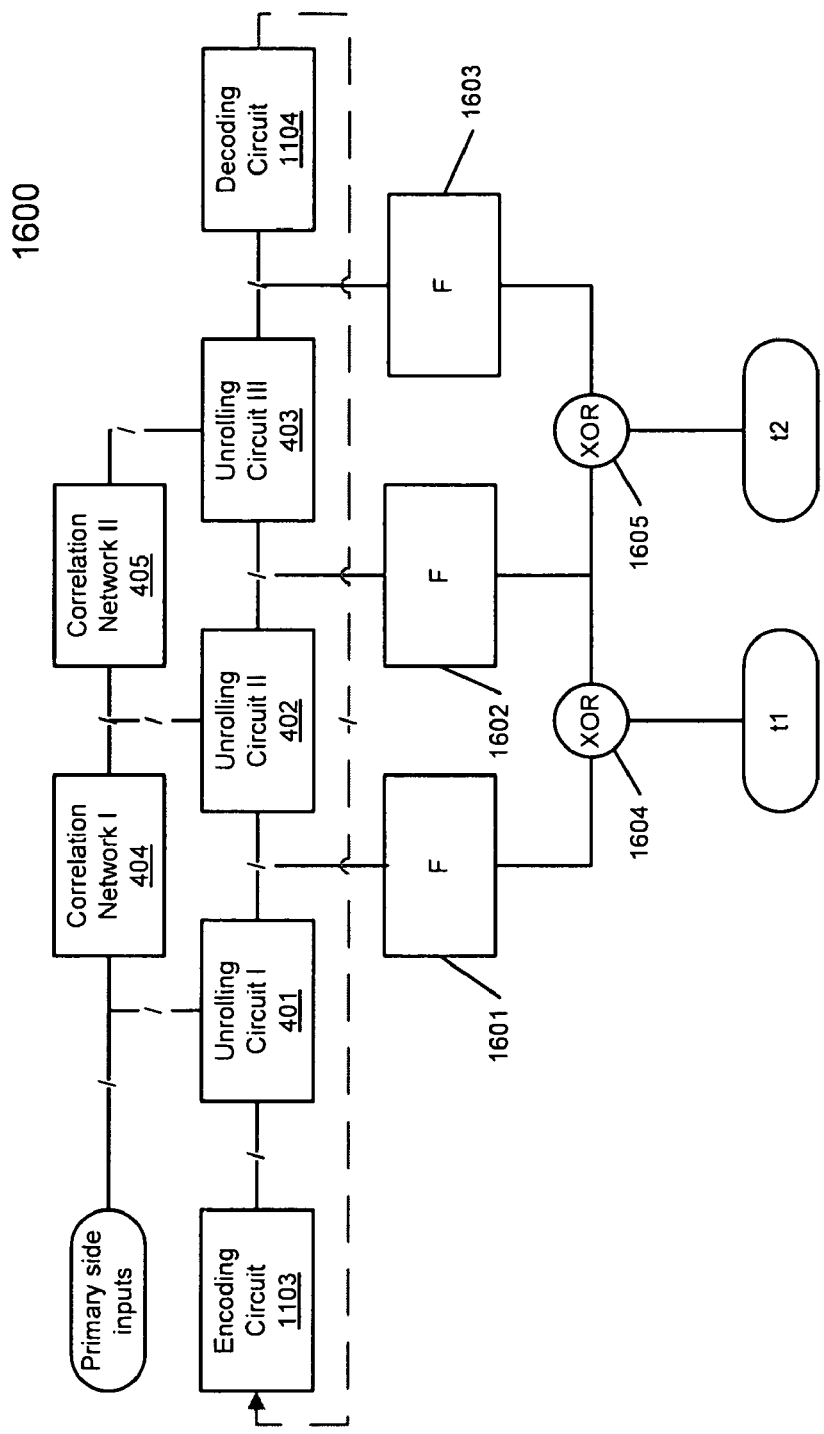
FIGS. 16A-16B are block diagrams illustrating an example of a solution for transition probability in view of both temporal and spatial correlations according to certain embodiments of the invention.
Figure 16B:
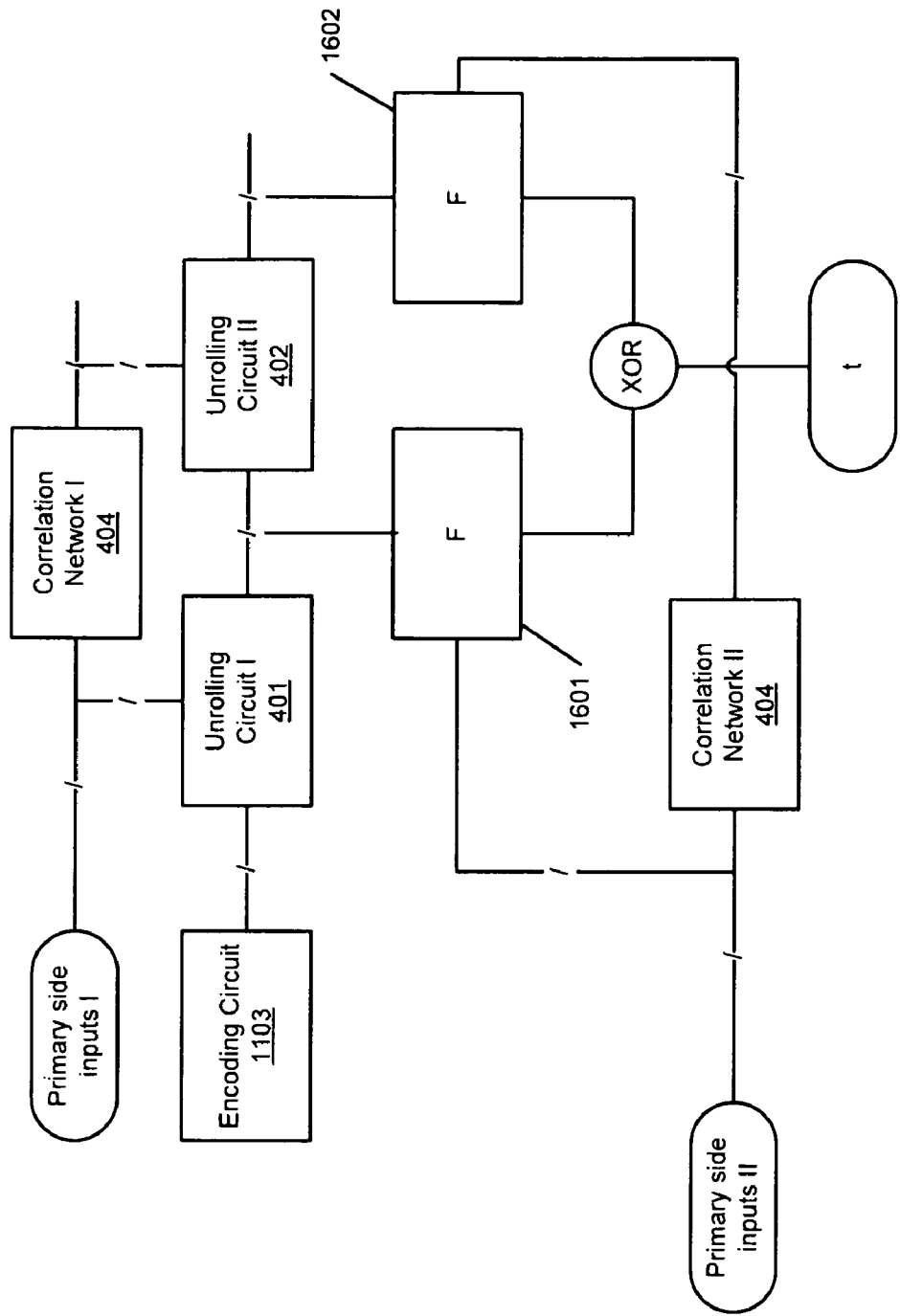
Figure 16C:
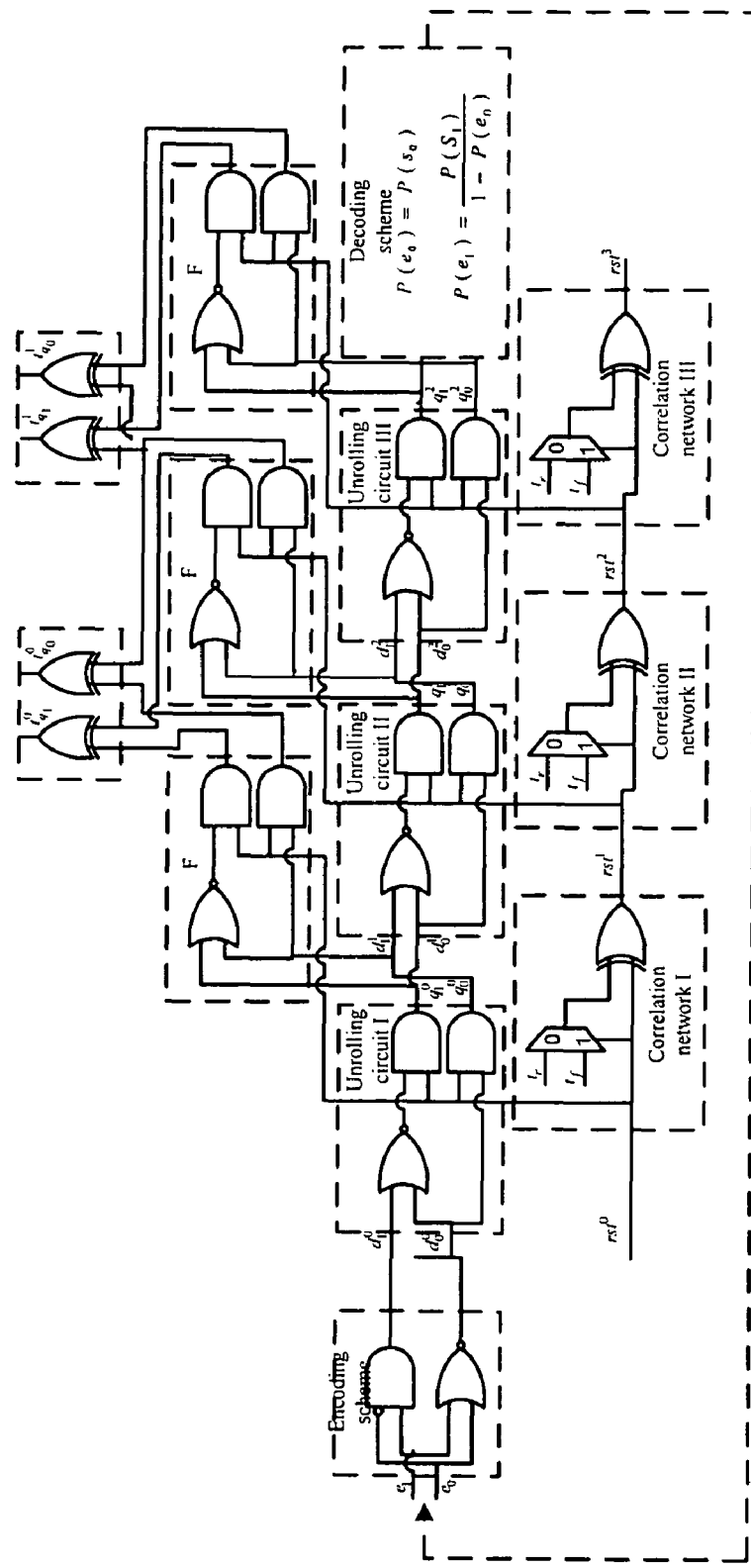
FIG. 16C is a schematic diagram representing a solution for transition probability using the technique as shown in FIGS. 16A-16B in view of the example circuit as shown in FIG. 13.

FIG. 16A is a block diagram illustrating an example of a solution for transition probability in view of both temporal and spatial correlations according to one embodiment of the invention. Referring to FIG. 16A, in addition to the components as shown in FIG. 12, a next state function is introduced to a net coupling two unrolled circuits. In this example, next state functions 1501-1503 are coupled to a node coupling two consecutive unrolled circuits such as unrolled circuits 401-404. A next state function F is configured to provide a state probability of a next state of an unrolled circuit. In addition, an XOR gate is utilized to provide a transition probability (e.g., $t_1/t_2$) in view of two state probabilities from two consecutive time frames (e.g., two unrolled circuits). Thus, the next state function F and the XOR gates are used to obtain a transition probability of a node. In addition, encoding circuit 1103 and decoding circuit 1104 can be used to restart the process of unrolling with a low memory consumption. Again note that a decoding circuit is only needed when there is a need to feed the output of the unrolled sequential circuit back to an input of the unrolled sequential circuit; otherwise, the decoding circuit is not needed as shown in FIG. 16B as an example. FIG. 16C is a schematic diagram representing a solution for transition probability using the technique as shown in FIGS. 16A-16B in view of the example circuit as shown in FIG. 13. In this example, a next state function is substantially the same as an unrolled circuit.

Figure 17B:
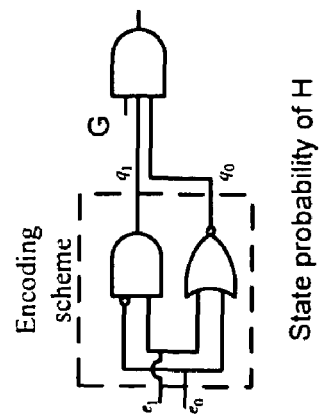
FIGS. 17A-17C are schematic diagrams illustrating an activity analysis according to an embodiment of the invention.
Figure 17A:
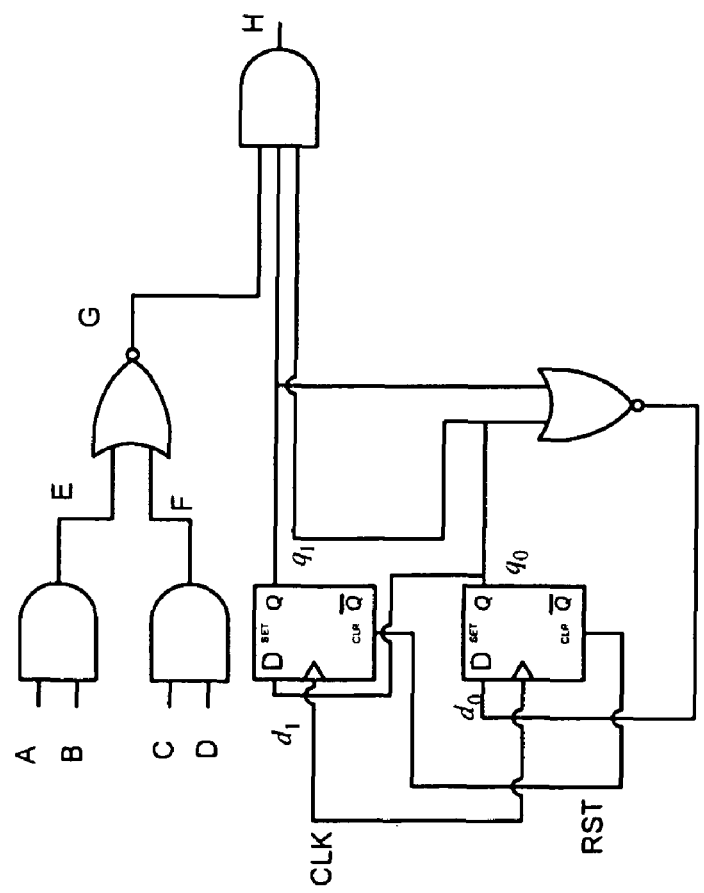
Figure 17C:
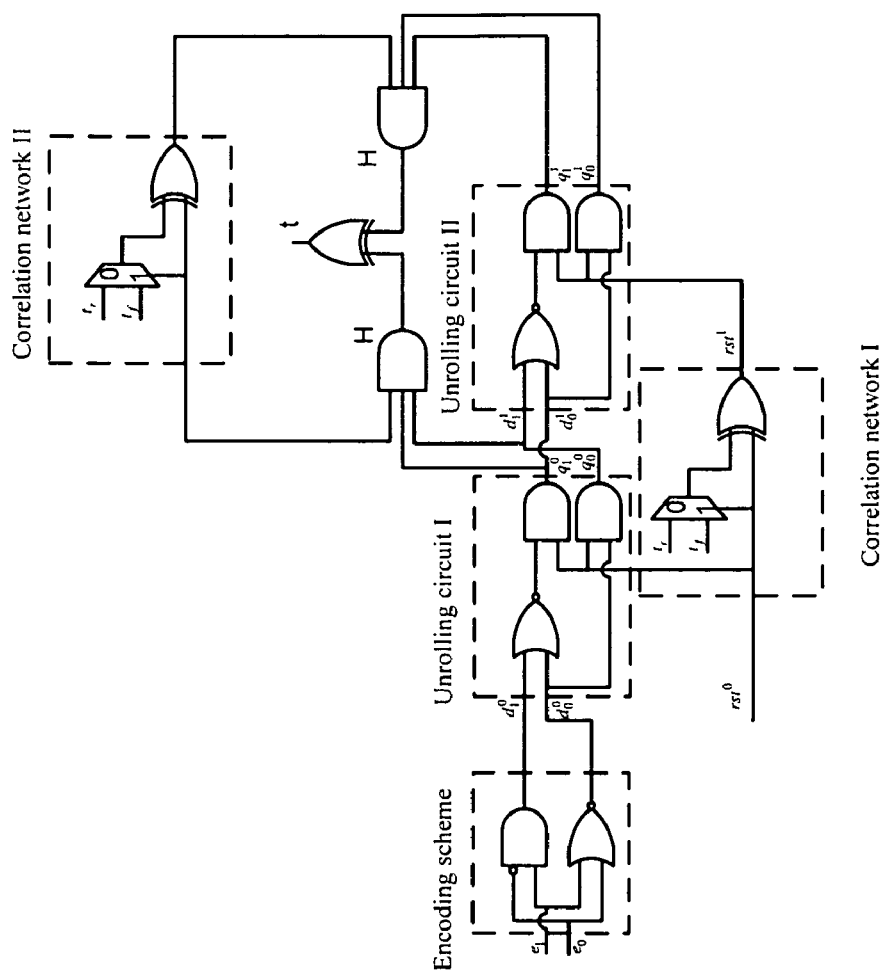

FIGS. 17A-17C are schematic diagrams illustrating an activity analysis according to an embodiment of the invention. The circuits as shown in FIGS. 17A-17C are utilized as an example of a general netlist that includes both combinational and sequential circuits, in which an activity analysis can be performed according to a process flow as shown in FIG. 2. Here, referring to FIGS. 17A-17C, it is assumed that signal A B C D has default state probabilities 0.5 and default transition probabilities 0.2. Referring to FIGS. 2 and 17A, initially, at block 201, a logic level of each signal is marked. In this example, level 0→(A B C D q1 q0)
level 1→(E F d0)
level 2→(G)
level 3→(H)

Then, the state and transition probabilities of each signal are calculated in an increasing order of signal level. In this example: E-F-d0-G-H. If all the inputs are independent of each other, operations of block 202 are performed. Here we take signal E as an example. Signal E has a logic function E=A AND B. Here, the state probability of signal E means the probability of signal E to be logic 1. The way to calculate the probability is to sum all the disjoint product terms which make signal E to be logic 1. Based on the logic function of E, we can conclude that signal E will be logic 1 only if both input A and B are logic 1. For a transition probability (block 203), we can use the following equation such that a calculation of a transition probability is converted into a calculation of a state probability. We define function G=F(V)XOR F(V XOR T). V is the vector of inputs and T is the enable vector. Here, F(V) represents the logic function; F(V XOR T) represents the logic function of the next state with all possible transitions. The function G is 1 when F(V)=0 and F(V XOR T)=1, or F(V)=1 and F(V XOR T)=0, i.e. the state probability of G is the transition probability of the F.

If some of the inputs are correlated signals, operations of block 204 are performed. Here, we take signal H as an example. Signal H has a logic function H=G AND q0 AND q1. Since q0 and q1 are signals from an FSM with a feedback loop, q0 and q1 are correlated signals. In order to include a spatial correlation in a state probability calculation of signal H, we need to add the same encoding scheme as shown in FIG. 17B. For a transition probability, we use the encoding scheme +2 stage unrolling circuit to include both temporal and spatial correlations from sequential signals q0 and q1. We also add a temporal correlation into the other combinational signal G. Therefore, as shown in FIG. 17C, we are able to calculate a transition probability (block 205) of signal H, basically, XORing a previous state with a current state in the time frame, such that the transition rate of signal H is converted into state probability. Thereafter, for each FSM, the techniques set forth above are used to calculate the state and transition probabilities of each sequential signal, in this example, i.e., q0, q1. The above processes can be performed iteratively.

Method to Collapse Circuit for Better Tradeoff Between Accuracy and Memory

As can be seen above, the deeper a sequential circuit been unrolled, the more accurate the result would be. However, the deeper a sequential circuit has been unrolled, the larger the memory consumption will be. A conventional method is to unroll a sequential circuit at a single level, which typically either the result is not accurate or it has a large memory requirement.

According to one of the invention, with the encoding scheme to represent the correct joint probabilities for a group of signals, the depth (e.g., unrolling stages) of an unrolled circuit can be controlled within certain memory constraints and activity data could be converged with iterations of calculating the statistics of the unrolled circuits multiple times. As a result, the encoding scheme can transform a very long chain of unrolled circuits (usually memory-consuming) into several iterations of computation on on a shallowly unrolled circuit chain with the support of the joint probability information. The encoding scheme can dramatically reduce a peak memory usage while still maintain the same or a similar level of accuracy. It can also improve an accuracy of the activity analysis by iteratively computing statistics on a shallowly unrolled circuit which cannot be done with a traditional method due to memory constraints.

Figure 18:
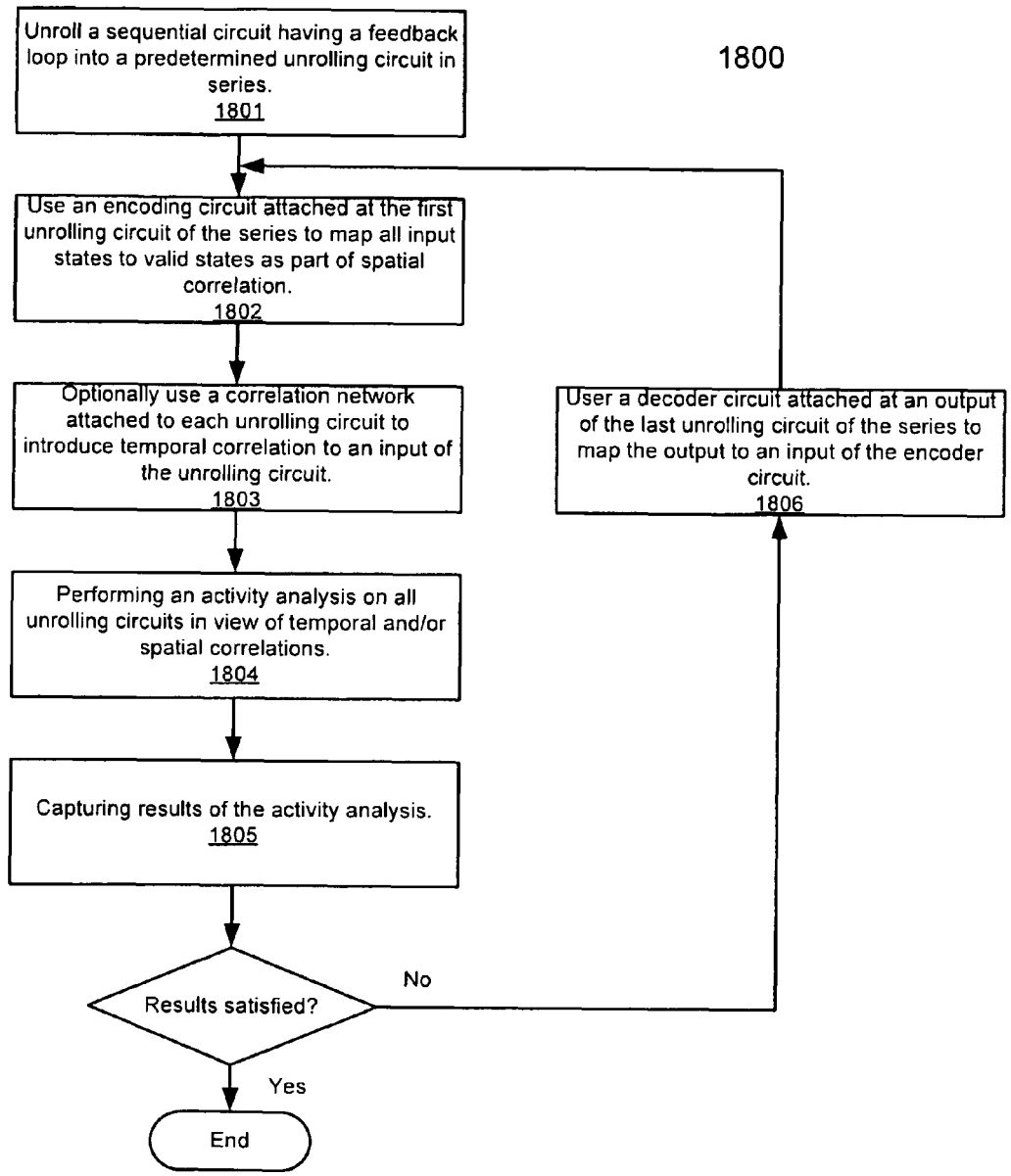
FIG. 18 is a flow diagram illustrating a process for activity analysis according to another embodiment of the invention.

FIG. 18 is a flow diagram illustrating a process for activity analysis according to another embodiment of the invention. Note that process 1800 may be performed by a processing logic which may include software, hardware, or a combination of both. Referring to FIG. 18, at block 1801, a sequential circuit having a feedback loop is unrolled into a predetermined number of unrolled circuits in a chain. At block 1802, an encoding circuit attached to an input of the first unrolled circuit in the chain is used to map all possible input states into only the valid states as part of introducing a spatial correlation, eliminating any invalid states. At block 1803, optionally a temporal correlation network attached to each unrolled circuit to introduce a temporal correlation to an input of the corresponding unrolled circuit if there is any side-cut input. At block 1804, an activity analysis is performed on the circuit in view of both the temporal and spatial correlations introduced by the correlation network and the encoding scheme. At block 1804, a result of the activity analysis is captured at block 1805. If the result is satisfied, process 1800 will end. If the result is not satisfied, at block 1806, a decoding circuit attached an output of the last unrolled circuit of the chain is used to collect the joint probabilities of the output and remap the output to the input of the encoding circuit, and thereafter, process 1800 can restart again. Other operations can also be performed.

Combined Hardware/Software Co-Activity Analysis

Typically, an activity analysis is performed on a circuit to capture the activity profile of all signals during hardware accelerated emulator/prototyping. As a circuit is getting larger and more complicated, an amount of signals to be captured is getting exponentially larger and sometimes, it is not practical any more.

According to one embodiment of the invention, for a large and complex circuit, instead of capturing activity information of all signals during the hardware accelerated emulating or prototyping, the circuit is partitioned into multiple blocks. Only a small set of key signals such as the activity data of group flops and boundary information are captured by the hardware. For example, as shown in FIG. 19A, for each group of signals a small memory is connected to an address which is formed by concatenating the previous state (refer to the bus "PREV STATE" in FIG. 19A) and next state (refer to the bus "NEXT STATE" in FIG. 19A) of the group. Each clock cycle the addressed location is incremented, capturing both the state probabilities and the state to state transition rates (refer to block 0002 in FIG. 19A). In the case that the number of bits in the group is too large, it is possible to compress the index by mapping a large number of low probability states to one code (refer to block 0001 in FIG. 19A). For example suppose that 12 states out of 250 are highly probable, then the remaining 250−12=238 states can be mapped to a single code, yielding a 4 bit index instead of 8 bits. By using the statistical formal analysis methods described throughout this application, the captured information can be propagated through the circuit and the activity data can be calculated for each signal. In comparison with a conventional method, this technique makes the on-board emulator/prototyping faster and much less area overhead.

According to one embodiment, a circuit is partitioned into multiple sub-blocks and the hardware only captures the activity information on a primary input stream and the signals between the sub-blocks (also referred to as boundary signals or inter-block signals). For each sub-block, a formal activity analysis is performed using some or all of the techniques set forth above. As a result, the speed of a simulator, emulator or other hardware prototype can be improved and the overhead of counting transistors can be reduced.

Figure 19B:
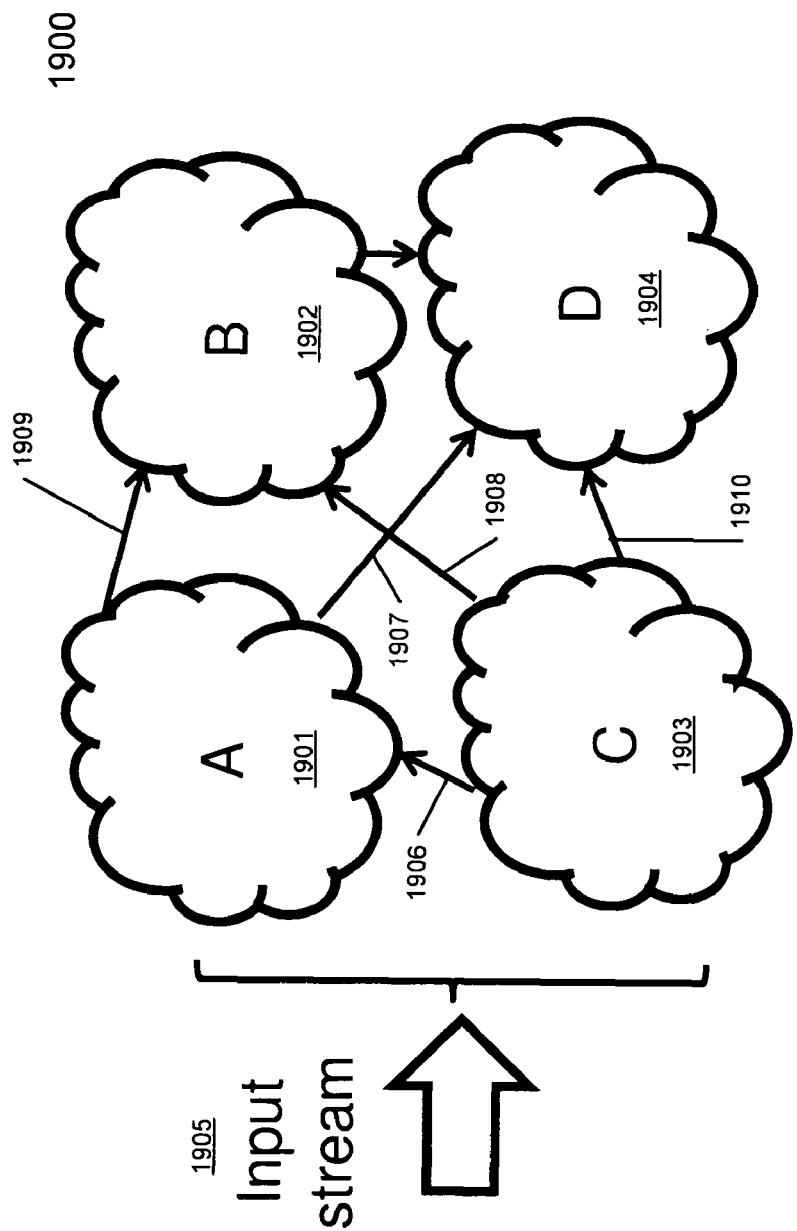
FIG. 19B is a block diagram illustrating a circuit to be partitioned into multiple sub-blocks according to one embodiment.

For example, as shown in FIG. 19B, circuit block 1900 is partitioned into sub-blocks 1901-1904. The circuit 1900 may be partitioned at a boundary that has the least connections (e.g., least inter-block connections). The hardware is configured to only capture the primary input signals 1905 as well as signals 1906-1910 between the sub-blocks 1901-1904 (e.g., inter-block signals). Within each of the sub-blocks 1901-1904, a formal analysis is performed using the techniques set forth above. For example, for sub-block 1901, signals 1905 and 1906 can be used as initial input signals for formal activity analysis of sub-block 1901. As a result, the hardware does not have to capture an activity profile for every signal within block 1901 and the hardware can be made less complicated.

FIG. 20 is a flow diagram illustrating a process for performing an activity analysis according to another embodiment of the invention. Note that process 2000 can be performed by processing logic which may include software, hardware, or a combination of both. Referring to FIG. 20, at block 2001, a circuit is partitioned into multiple sub-blocks. For example, the circuit may be partitioned at a boundary having minimum cuts between the sub-blocks. At block 2002, hardware such as emulator/prototyping device is configured to capture certain key signals between the sub-blocks without having to capture all internal signals of each sub-block. The key signals may be those related to the activity data of the flops and/or boundary information. For each sub-block, at block 2003, processing logic performs a formal activity analysis in consideration of temporal and/or spatial correlations based on the captured information. In one embodiment, the formal activity analysis is performed using a correlation network and/or an encoding scheme to introduce temporal and/or spatial correlations as described above. Such a process can be repeatedly performed until all sub-blocks have been processed. Other operations may also be performed.

Example of Data Processing System

Figure 21:
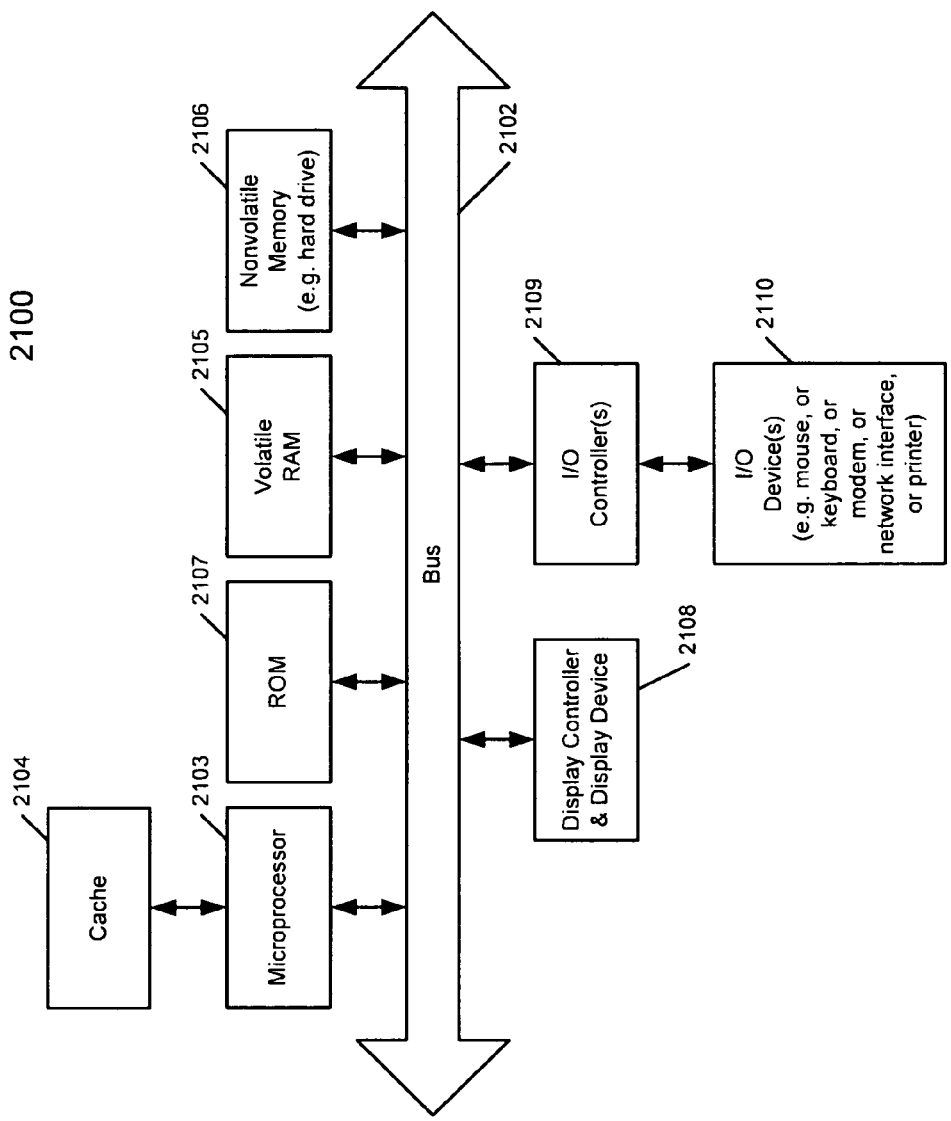
FIG. 21 is a block diagram of a digital processing system, which may be used with one embodiment of the invention.

FIG. 21 is a block diagram of a digital processing system, which may be used with one embodiment of the invention. For example, the system 2100 shown in FIG. 21 may be used perform a formal activity analysis using techniques as described above.

Note that while FIG. 21 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention. The computer system of FIG. 21 may, for example, be an Apple Macintosh computer or an IBM compatible PC.

As shown in FIG. 21, the computer system 2100, which is a form of a data processing system, includes a bus 2102 which is coupled to a microprocessor 2103 and a ROM 2107, a volatile RAM 2105, and a non-volatile memory 2106. The microprocessor 2103, which may be, for example, a PowerPC G4 or PowerPC G5 microprocessor from Motorola, Inc. or IBM, is coupled to cache memory 2104 as shown in the example of FIG. 21. The bus 2102 interconnects these various components together and also interconnects these components 2103, 2107, 2105, and 2106 to a display controller and display device 2108, as well as to input/output (I/O) devices 2110, which may be mice, keyboards, modems, network interfaces, printers, and other devices which are well-known in the art.

Typically, the input/output devices 2110 are coupled to the system through input/output controllers 2109. The volatile RAM 2105 is typically implemented as dynamic RAM (DRAM) which requires power continuously in order to refresh or maintain the data in the memory. The non-volatile memory 2106 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 21 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 2102 may include one or more buses connected to each other through various bridges, controllers, and/or adapters, as is well-known in the art. In one embodiment, the I/O controller 2109 includes a USB (Universal Serial Bus) adapter for controlling USB peripherals. Alternatively, I/O controller 2109 may include an IEEE-1394 adapter, also known as FireWire adapter, for controlling FireWire devices.

Thus, techniques for statistical formal activity analysis with consideration of temporal and/or spatial correlations are described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine-implemented method for circuit analysis, the method comprising:
   unrolling a sequential circuit into a plurality of unrolled circuits; and
   introducing a temporal correlation between input signals in each of the unrolled circuits via a correlation network coupled to the plurality of unrolled circuits for an activity analysis of the sequential circuit, the temporal correlation representing a dependency relationship between a current logic state of a signal and a previous logic state of the signal, wherein at least one of the unrolling and introducing is performed by a processor.

2. The method of claim 1, further comprising performing the activity analysis in view of the temporal correlation introduced by the correlation network, including propagating activity data through a finite state machine (FSM) representing the sequential circuit in view of the temporal correlation to determine state and transition probabilities of internal signals and output signals of the sequential circuit.

3. The method of claim 1, wherein the correlation network is configured to determine a next logic state of a signal of an unrolled circuit based on a current logic state of the signal and the switching activity of the signal of the unrolled circuit.

4. The method of claim 1, further comprising:
   for each unrolled circuit, calculating a state probability of an output in view of a state probability of an input and a transition probability of a switching activity of the input; and
   calculating a transition probability of the output in view of the state probability of the input and the transition probability of the switching activity of the input, wherein the transition probability of the switching activity of the input is introduced by the correlation network.

5. The method of claim 1, wherein the correlation network for an input is configured to generate a signal which is to be connected to the corresponding input of the next unrolled circuit and where the value of said signal is based on a state of the input signal in the current unrolled circuit, the falling transition rate of the input signal and the rising transition rate of the input signal.

6. The method of claim 5, wherein the correlation network comprises a truth table having a plurality of entries, wherein each entry, given a current state of a signal, a falling switching activity of the signal, and a rising switching activity of the signal, provides the probabilities of the possible next states of the signal.

7. The method of claim 1, further comprising introducing a spatial correlation to an input of the unrolled sequential circuit using an encoding circuit, the spatial correlation representing a dependency relationship between the input and one or more other signals, wherein the activity analysis is performed in view of both the temporal correlation and the spatial correlation.

8. The method of claim 7, wherein the encoding circuit is configured to propagate joint probability information of multiple signals to introduce the spatial correlation to the input of the unrolled sequential circuit.

9. The method of claim 8, wherein the encoding circuit is configured to map all possible states to at least one of reachable states of the FSM.

10. The method of claim 8, further comprising collecting the joint probability information from an output of the unrolled sequential circuit using a decoder circuit, the decoder circuit providing the collected joint probability information to the encoder circuit via a feedback loop.

11. The method of claim 10, further comprising iteratively performing the activity analysis on the unrolled sequential circuit using the encoding circuit and decoding circuit via the feedback loop.

12. A non-transitory machine-readable storage medium storing machine executable instructions, which when executed by a machine, cause the machine to perform a method for circuit analysis, the method comprising:
    unrolling a sequential circuit into a plurality of unrolled circuits; and
    introducing a temporal correlation between input signals in each of the unrolled circuits via a correlation network coupled to the plurality of unrolled circuits for an activity analysis of the sequential circuit, the temporal correlation representing a dependency relationship between a current logic state of a signal and a previous logic state of the signal.

13. The non-transitory machine-readable storage medium of claim 12, wherein the method further comprises performing the activity analysis in view of the temporal correlation introduced by the correlation network, including propagating activity data through a finite state machine (FSM) representing the sequential circuit in view of the temporal correlation to determine state and transition probabilities of internal signals and output signal of the sequential circuit.

14. The non-transitory machine-readable storage medium of claim 12, wherein the correlation network is configured to determine a next logic state of a signal of an unrolled circuit based on a current logic state of the signal and the switching activity of the signal of the unrolled circuit.

15. The non-transitory machine-readable storage medium of claim 12, wherein the method further comprises:
    for each unrolled circuit, calculating a state probability of an output in view of a state probability of an input and a transition probability of a switching activity of the input; and
    calculating a transition probability of the output in view of the state probability of the input and the transition probability of the input, wherein the transition probability of the input is introduced by the correlation network.

16. The non-transitory machine-readable storage medium of claim 12, wherein the correlation network for an input is configured to generate a signal which is to be connected to the corresponding input of the next unrolled circuit and where the value of said signal is based on a state of the input signal in the current unrolled circuit, the falling transition rate of the input signal and the rising transition rate of the input signal.

17. The non-transitory machine-readable storage medium of claim 12, wherein the correlation network comprises a truth table having a plurality of entries, wherein each entry, given a current state of a signal, a falling switching activity of the signal, and a rising switching activity of the signal, provides an estimate of a next state of the signal.

18. The non-transitory machine-readable storage medium of claim 12, wherein the method further comprises introducing a spatial correlation to an input of the unrolled sequential circuit using an encoding circuit, the spatial correlation representing a dependency relationship between the input and one or more other signals, wherein the activity analysis is performed in view of both the temporal correlation and the spatial correlation.

19. The non-transitory machine-readable storage medium of claim 18, wherein the encoding circuit is configured to propagate joint probability information of multiple signals to introduce the spatial correlation to the input of the unrolled sequential circuit.

20. The non-transitory machine-readable storage medium of claim 19, wherein the encoding circuit is configured to map all possible states to at least one of reachable states of the FSM.

21. The non-transitory machine-readable storage medium of claim 19, wherein the method further comprises collecting the joint probability information from an output of the unrolled sequential circuit using a decoder circuit, the decoder circuit providing the collected joint probability information to the encoder circuit via a feedback loop.

22. The non-transitory machine-readable storage medium of claim 21, wherein the method further comprises iteratively performing the activity analysis on the unrolled sequential circuit using the encoding circuit and decoding circuit via the feedback loop.

* * * * *